(12) United States Patent
Sekizawa et al.

(10) Patent No.: US 12,095,281 B2
(45) Date of Patent: Sep. 17, 2024

(54) WIRELESS POWER FEEDING SYSTEM HAVING TUNING ADJUSTMENT CIRCUIT

(71) Applicant: Raisontech Inc., Kuki (JP)

(72) Inventors: Yasushi Sekizawa, Kuki (JP); Kenji Tahara, Kuki (JP)

(73) Assignee: Raisontech Inc., Kuki (JP)

( * ) Notice: Subject to any disclaimer, the term of this patent is extended or adjusted under 35 U.S.C. 154(b) by 12 days.

(21) Appl. No.: 17/787,227

(22) PCT Filed: Dec. 16, 2020

(86) PCT No.: PCT/JP2020/046981
§ 371 (c)(1),
(2) Date: Jun. 17, 2022

(87) PCT Pub. No.: WO2021/125228
PCT Pub. Date: Jun. 24, 2021

(65) Prior Publication Data
US 2023/0016332 A1    Jan. 19, 2023

(30) Foreign Application Priority Data
Dec. 20, 2019 (JP) ................. 2019-230720

(51) Int. Cl.
*H02J 50/12* (2016.01)
*H02J 50/40* (2016.01)
(Continued)

(52) U.S. Cl.
CPC .............. *H02J 50/12* (2016.02); *H02J 50/40* (2016.02); *H02J 50/60* (2016.02); *H02J 50/80* (2016.02); *H02J 50/90* (2016.02)

(58) Field of Classification Search
CPC ............ H02J 50/12; H02J 50/40; H02J 50/60; H02J 50/80; H02J 50/90; H02J 50/402; H03H 7/0115
See application file for complete search history.

(56) References Cited

U.S. PATENT DOCUMENTS 9,948,141 B2 * 4/2018 Hosotani ................. H02J 50/12
2012/0019076 A1 * 1/2012 Urano ....................... H04B 5/22
307/104

(Continued)

FOREIGN PATENT DOCUMENTS

JP    2013-243882 A    12/2013
JP    2014-176122 A     9/2014

(Continued)

*Primary Examiner* — Jared Fureman
*Assistant Examiner* — Michael J Warmflash
(74) *Attorney, Agent, or Firm* — Blank Rome LLP

(57) ABSTRACT

A system for performing wireless power feeding using an existing electronic device. In the present invention, a power feeder has a power feeding coil. A power receiver has a power receiving coil, a power receiving circuit unit, and a load. Electromagnetic induction using a resonance phenomenon causes the power feeder to supply an electric energy to the power receiver. A switching circuit enables the power feeding coil to periodically repeat turning on (driving state) and turning off (resonant state) of power supply. A resonant frequency of the power receiver is substantially a period combining a time of the driving state and a time of the resonant state. A resonant frequency of the power feeder is substantially a period of the time of the resonant state, and a tuning adjusting circuit performs adjustment of a resonant capacitor and a coil.

42 Claims, 32 Drawing Sheets

(51) Int. Cl.
*H02J 50/60* (2016.01)
*H02J 50/80* (2016.01)
*H02J 50/90* (2016.01)

(56) References Cited

U.S. PATENT DOCUMENTS

| | | | |
|---|---|---|---|
| 2013/0257173 A1* | 10/2013 | Saitoh | H02J 50/70 |
| | | | 307/104 |
| 2014/0035364 A1 | 2/2014 | Uramoto et al. | |
| 2014/0070765 A1* | 3/2014 | Hasegawa | H02J 50/60 |
| | | | 320/108 |
| 2014/0339915 A1* | 11/2014 | Kanno | B60L 53/51 |
| | | | 307/104 |
| 2015/0214788 A1* | 7/2015 | Hosotani | H02J 50/12 |
| | | | 307/104 |
| 2016/0043562 A1* | 2/2016 | Lisi | H02J 50/12 |
| | | | 307/104 |
| 2016/0094046 A1* | 3/2016 | Kato | H02M 3/01 |
| | | | 307/104 |
| 2021/0083510 A1 | 3/2021 | Liu et al. | |
| 2022/0149661 A1* | 5/2022 | Goodchild | H02J 50/005 |

FOREIGN PATENT DOCUMENTS

| | | |
|---|---|---|
| JP | 2015-053751 A | 3/2015 |
| JP | 2017-028770 A | 2/2017 |
| JP | 2017-028998 A | 2/2017 |
| JP | 2017-163647 A | 9/2017 |
| JP | 2017-528106 A | 9/2017 |
| WO | WO 2013/128815 A1 | 9/2013 |
| WO | WO 2014/068992 A1 | 5/2014 |
| WO | WO 2016/041880 A1 | 3/2016 |
| WO | WO 2019/228159 A1 | 5/2019 |

* cited by examiner

SERIES RESONANT CIRCUIT $V_L = V_C = Q V_R$
$= Q E$

AT RESONANCE,
VOLTAGE THAT IS Q TIMES POWER SUPPLY
VOLTAGE IS APPLIED TO L AND C.

COUPLING CHARACTERISTICS WHEN RESONANCE FREQUENCY
IS THE SAME IN POWER FEEDING AND POWER RECEPTION

COUPLING CHARACTERISTICS WHEN RESONANCE FREQUENCY
IS THE SAME IN POWER FEEDING AND POWER RECEPTION

COUPLING CHARACTERISTICS WHEN RESONANCE FREQUENCY
IS THE SAME IN POWER FEEDING AND POWER RECEPTION

COUPLING CHARACTERISTICS WHEN RESONANCE FREQUENCY
IS THE SAME IN POWER FEEDING AND POWER RECEPTION

COUPLING CHARACTERISTICS WHEN RESONANCE FREQUENCY
IS DIFFERENT BETWEEN POWER FEEDING AND POWER RECEPTION

COUPLING CHARACTERISTICS WHEN RESONANCE FREQUENCY
IS DIFFERENT BETWEEN POWER FEEDING AND POWER RECEPTION

COUPLING CHARACTERISTICS WHEN RESONANCE FREQUENCY
IS DIFFERENT BETWEEN POWER FEEDING AND POWER RECEPTION

COUPLING CHARACTERISTICS WHEN RESONANCE FREQUENCY
IS DIFFERENT BETWEEN POWER FEEDING AND POWER RECEPTION

WIRELESS POWER FEEDING SYSTEM HAVING TUNING ADJUSTMENT CIRCUIT

FIELD OF THE INVENTION

The present invention relates to wireless power feeding, in particular, to wireless power feeding powered by resonant inductive coupling.

DESCRIPTION OF THE RELATED ART

A number of devices based on various methods and ways have been proposed in the field of wireless power feeding technology. Among them, a method using electromagnetic induction is generally well known. Also, among them, a method using a resonance technique by electromagnetic induction is representative and is referred as various names. The present invention is based on a technology using magnetic coupling using an LC resonant circuit.

Korea Laid-Open Patent Publication No. 2017-163647 discloses a wireless power feeding method and power feeding system that enable the expanded use of a wider range of frequencies in wireless power feeding capable of feeding power to a relatively long distance by coupling by electromagnetic field resonance. The electromagnetic field resonance wireless power feeding method is for wireless power feeding in which a power transmission circuit of a power transmission device and a power reception circuit of a power reception device are coupled by electromagnetic field resonance, and the power transmission device is configured to supply two different frequency components f1 and f2 to a power source 2. The resonance frequencies of the power transmission circuit are referred as f1 and/or f2, the conditions of the power transmission circuit are periodically changed to an electric transient state in which the current and/or voltage is not stable. In the power reception device, the resonance frequency of the power reception circuit is (f2−f1) or (f1+f2) due to the beat phenomenon, and electric power at the frequency of (f2−f1) or (f1+f2) is supplied to the load.

Korea Laid-Open Patent Publication No. 2017-0:28998 discloses a very simple wireless power feeder using a loop coil as a power transmission device. The power transmission loop coil installed in the power transmission device extracts electric energy from the DC power supply and generates periodically changing electromagnetic field resonance energy in the space. The power reception loop coil provided in a power receiver extracts the periodically changing electromagnetic field resonance energy from the space as electric energy and supplies electric power to the load. The power transmission loop coil and the power reception loop coil are electromagnetically resonantly coupled, and power is wirelessly supplied from the power transmission device to the power receiver.

Korea Laid-Open Patent Publication No. 2017-028770 discloses a wireless power feeding system that is provided with a plurality of relay devices and that suppresses a reduction in power transmission efficiency due to the relay devices. It includes a power transmission device that transmits the power to be fed, a plurality of relay devices that relays the power transmitted from the power transmission device, a power receiver that receives the power relayed by the relay device, and a control device that controls the relay device so that power is transmitted through the transmission path that maximizes the transmission efficiency of the power in a plurality of transmission paths that transmit the power from the power transmission device to the power receiver via the relay device.

Korea Laid-Open Patent Publication No. 2014-176122 discloses a technique for increasing the power transmission efficiency of a magnetic resonance type wireless power feeding system. The magnetic resonance type wireless power feeding system is provided with an AC power supply, a voltage conversion coil connected to the AC power supply, a power transmission side circuit, a power reception side LC circuit, an impedance conversion coil, and a load connected to the impedance conversion coil, and a transmission efficiency controlling capacitor connected in parallel to the load. The power transmission side LC circuit is arranged in the vicinity of the voltage conversion coil and has a power transmission side coil and a power transmission side capacitor that are excited by electromagnetic induction with the voltage conversion coil. The power reception side LC circuit has a power reception side coil and a power reception side capacitor that resonate with the power transmission side coil. The impedance conversion coil is arranged in the vicinity of the power reception side LC circuit and is excited by electromagnetic induction with the power reception side coil. The transmission efficiency controlling capacitor has a capacitance that increases the transmission efficiency of electric power from the AC power source to the load.

Technical Problem

There are electronic devices that use a built-in battery. When such a battery is discharged and consumed, it is common to attach an electronic device to a dedicated charger to charge it.

In addition, a battery charging method using wireless power feeding has been recently proposed. It is realized by providing a dedicated coil and electric circuit in a power feeding side charging device and a power reception side electronic device.

There are some that use a resonant circuit for wireless power feeding. The power feeding side resonant circuit is selected as a series resonant circuit or a parallel resonant circuit. The series resonant circuit easily transmits a large amount of energy, but has a large loss. On the other hand, the parallel resonant circuit is used to transmit a relatively small amount of energy and has a characteristic that it is easy to create a stable resonant state.

In the conventional general wireless power feeding, it was common to employ the series resonant circuit on the feeding side (refer to FIG. 9). Also, a method of detecting a resonant state and controlling the frequency has been used. The resonance frequency fluctuates depending on the position and posture of the power reception device, and the ferrite coil of the power reception device has a significant variation in electrical performance depending on the material and winding state. For this reason, if the resonance frequency is different, the power feeding efficiency deteriorates, and thus, the controlling of the resonance frequency on the power feeding side is conducted.

As a method frequently used, the reception side detects a resonant state and such information is transmitted to the power feeding side by some communication method (Qi standard, etc.) and the like. In such a structure, there are many factors of cost increase.

The inventor of the present invention employs a parallel resonant circuit on the power feeding side in order to solve such a problem. The power receiver may be either the series resonant circuit or the parallel resonant circuit, but if it is the parallel resonant circuit, the power receiver can be made with a very simple configuration. This simplicity, compared to the series resonant circuit, correlates with a small number of electronic components used, and also means that losses caused by electronic components are further reduced. Accordingly, it became possible to make the heat generation and the like relatively low.

At the same time, the decrease in power feeding efficiency due to fluctuation in the resonance frequency due to the position and posture of the power reception device can be relatively low.

However, on the other hand, it has been said that the parallel resonant circuit is not suitable for wireless power feeding. First, at the maximum resonance point, the voltage becomes very large, which may damage electronic circuit elements. Second, it has been considered that it is difficult to increase the power feeding efficiency.

An object of the present invention is to break the existing concept that the parallel resonant circuit is not suitable for wireless power feeding and to provide a wireless power feeding system having an effect that cannot be achieved without the parallel resonant circuit.

Technical Solution

The inventor of the present invention employs the parallel resonant circuit on the power feeding side, and has achieved the above objects by studying a driving method of the power feeding side with a timing and adjusting method for switching between a driving state and a resonant state, and the resonance frequency adjustment method.

A wireless power feeding system of a parallel resonant circuit according to the present invention includes a power feeder including a power feeding coil for generating magnetic flux and a power feeding circuit unit for supplying power to the power feeding coil to generate the magnetic flux, and a power receiver including a power reception coil receiving the magnetic flux output from the power feeding coil, and a power reception circuit unit recovering energy generated in the power reception coil by electromagnetic induction, wherein electrical energy is supplied from the power feeder to the power receiver by the electromagnetic induction using a resonance phenomenon, the power reception circuit unit of the power receiver includes a power reception side resonant capacitor forming a power reception side resonant circuit to resonate with a power reception side resonance period in combination with the power reception coil, the power feeding circuit unit of the power feeder includes a power feeding side resonant capacitor adjusted to a resonance frequency in the resonant state of the power feeder so as to form a parallel resonant circuit in combination with the power feeding coil, a switch circuit that periodically repeats on (driving state) and off (resonant state) of power supply with respect to the power feeding coil of the power feeder alternatively, a control circuit that inputs a driving pulse signal for controlling on and off of the switch circuit and precisely adjusts the power feeding side resonance period of the power feeding side parallel resonant circuit according to a timing of inputting the driving pulse signal, and a power feeding side tuning adjustment circuit that precisely adjusts a capacitance of the power feeding side resonant capacitor or an inductance of the power feeding coil.

Accordingly, it is possible to avoid a voltage rise at the maximum resonance and to increase the power feeding efficiency.

In addition, the power reception circuit unit of the power receiver further includes a power reception side tuning adjustment circuit that precisely adjusts the capacitance of the power reception side resonant capacitor or the inductance of the power reception coil.

Accordingly, it is possible to adjust the power feeding efficiency.

The power feeding side tuning adjustment circuit is conducted so that the power reception side resonance period (t3) is $0.9(t1+t2)=<t3=<1.1(t1+t2)$ for an off time of the switch circuit, that is, the time (t1+t2) that is a sum of a driving state time (t1) and a resonant state time (t2) of the power feeder.

Here, =< means that the left side is smaller than or equal to the right side, that is, less than or equal to the right side.

Accordingly, it is possible to avoid a voltage rise at the maximum resonance and to increase the power feeding efficiency.

In $0.9(t1+t2)>t3$, $t3>1.1(t1+t2)$, there is a possibility that problems such as a voltage rise at the maximum resonance and a decrease in power feeding efficiency may occur.

The power feeding side tuning adjustment circuit includes a single or plurality of other parallel-connected capacitors, and adjusts the capacitance of the power feeding side resonant capacitor by using the single or plurality of capacitors.

Accordingly, it is possible to avoid the voltage rise at the maximum resonance and to increase the power feeding efficiency.

The switch circuit turns on the driving pulse signal at a timing when a resonant coil voltage becomes near a zero value, maintains the resonant coil voltage near the zero value while the driving pulse signal is on, and controls the driving current with the resonant coil current as an upper limit to flow while the driving pulse is on.

Accordingly, it is possible to avoid the voltage rise at the maximum resonance and to increase the power feeding efficiency.

A distortion component of the resonant coil current generated by the driving current of the power feeder is taken as a magnetic flux fluctuation of the power feeding coil due to the distortion component, and the energy generated in the power reception coil of the power receiver by the electromagnetic induction is recovered in the power reception circuit so that energy transferring from the power feeding circuit to the power reception circuit is implemented.

Accordingly, it is possible to avoid the voltage rise at the maximum resonance and to increase the power feeding efficiency.

The power feeding coil of the power feeder is composed of a coil with 1 to 5 turns or less, and a size of the coil of the power feeding coil is larger than a size of the power reception coil of the power receiver.

Accordingly, it is possible to avoid the voltage rise at the maximum resonance and to increase the power feeding efficiency.

The power feeding coil of the power feeder and the power feeding side resonant capacitor constitute a parallel resonant circuit, and the power reception coil of the power receiver and the power reception side resonant capacitor constitute either the parallel resonant circuit or a series resonant circuit.

Accordingly, it is possible to avoid the voltage rise at the maximum resonance and to increase the power feeding efficiency.

A driving time of the power feeder, that is, a time during which a driving pulse is on, is ¼ or less of a resonance frequency period of the power receiver, and the wireless power feeding system further comprises a driving time adjustment circuit that adjusts the driving time so that a power feeding efficiency and an output power of the power receiver increase within the range in consideration of a power feeding range to be obtained, a power feeding distance, and specifications of the power feeding coil and the power reception coil.

Accordingly, it is possible to avoid the voltage rise at the maximum resonance and to increase the power feeding efficiency.

The tuning adjustment circuit adjusts the driving time so that a coupling coefficient (K) of the power feeding coil of the power feeder and the power reception coil of the power receiver is in a range of 0.3 (30%) or less, and the power feeding efficiency increases in consideration of a power feeding range to be obtained, a power feeding distance, specifications of the power feeding coil and the power reception coil, and the like.

Accordingly, it is possible to avoid the voltage rise at the maximum resonance and to increase the power feeding efficiency.

The system further includes a frequency adjustment circuit for changing a resonance frequency of the power feeder and a resonant state sensor, the resonant state sensor includes a voltage sensor and a current sensor connected to the control circuit and a phase detection circuit for detecting a phase according to inputs of the voltage sensor and the current sensor. The control circuit collectively controls both of the switch circuit and the frequency adjustment circuit to adjust a driving pulse time to adjust a power feeding side resonance frequency period based on an output of the resonant state sensor so that the resonance frequency or power feeding capability (power) provides the high power feeding efficiency, and adjusts the resonant capacitor or changes a power feeding coil pattern.

Accordingly, it is possible to avoid the voltage rise at the maximum resonance and to increase the power feeding efficiency.

When it is determined that it is an abnormal resonance state based on information from the resonant state sensor, the control circuit of the power feeder stops the driving pulse in a normal state to temporarily bring the power feeding efficiency close to zero and moves to a stop or standby state (sleep state) of the power feeding.

Accordingly, it is possible to avoid the voltage rise at the maximum resonance and to increase the power feeding efficiency.

The control circuit of the power feeder supplies power at a predetermined intermittent or weaker output than usual in the standby state (sleep state), and makes a determination based on an output of the resonant state sensor and returns to the normal state when the power receiver is in a power feedable state.

Accordingly, it is possible to avoid the voltage rise at the maximum resonance and to increase the power feeding efficiency.

The system further includes a power feeder complex in which a plurality of power feeders, each including the power feeding coil, the power feeding side resonant capacitor, the switch circuit and the control circuit, is arranged in parallel, and a collective control circuit for collectively controlling the control circuit of the plurality of power feeders forming the power feeder complex. The collective control circuit controls the state of the plurality of power feeders, that is, the stop state, standby state (sleep state), and normal state of the power feeding.

Accordingly, it is possible to avoid the voltage rise at the maximum resonance and to increase the power feeding efficiency.

The collective control circuit sets a specification of each power feeding coil, resonance frequency, and a specification of the driving time to use each of the plurality of power feeders constituting the power feeder complex with changed power feeding distance, power feeding range, and power feeding capability, and controls the state of the plurality of power feeders, that is, the stop state, standby state (sleep state), and normal state of the power feeding, based on the information from the resonant state sensor installed in each of the power feeders.

Accordingly, it is possible to increase the degree of freedom for designing the power feeding range such as a positional relationship between the power feeder that can be fed and the power receiver, a distance, a height, and an area.

The power feeder includes a power feeding side communication means for transmitting and receiving transmission data by changing an amplitude of a carrier wave in response to a bit sequence of transmission data, which is a digital signal, the power receiver has information determined by individual identification (ID) and a state sensor, the power feeding side communication means obtains the individual identification and state recognition of the power reception side, the power feeding side control circuit adjusts a foreign object detection countermeasure and the driving pulse time for increasing the power feeding efficiency, and adjusts the resonance frequency that adjusts the resonant capacitor or changes the power feeding coil pattern.

Accordingly, it is possible to avoid the voltage rise at the maximum resonance and to increase the power feeding efficiency.

The power receiver has variable output power information related to a required output power, the power feeding side communication means receives the output power information of the power receiver, the power feeder further includes a driving time dialogue adjustment circuit for controlling the driving time of the power feeder in the resonance frequency period range of the power receiver in accordance with the output power information received by the power feeding side communication means.

Accordingly, it is possible to avoid the voltage rise at the maximum resonance and to increase the power feeding efficiency.

A wireless power feeding system includes a power feeder including a power feeding coil for generating a magnetic flux, a power feeding side resonant capacitor forming a resonant circuit with the power feeding coil, and a power feeding circuit unit for supplying a driving current to the power feeding coil to generate the magnetic flux, and a power receiver including a power reception coil receiving the magnetic flux output from the power feeding coil, a power reception side resonant capacitor forming the resonant circuit with the power reception coil, and a power reception circuit unit recovering energy generated in the power reception coil by electromagnetic induction, wherein electrical energy is supplied from the power feeder to the power receiver by the electromagnetic induction using a resonance phenomenon. The power feeding circuit unit of the power feeder generates the driving current so that a resonant coil current generated in the power feeding coil by the driving current has distortion compared to a sine wave, the power feeding coil sends the distortion to the power reception coil as a change in the magnetic flux generated in the power feeding coil by the driving current, the power reception coil receives the distortion as energy generated in the power reception coil by the electromagnetic induction, the power reception circuit recovers the distortion as electrical energy, so that energy transfer is implemented from the power feeding circuit to the power reception circuit.

Accordingly, it is possible to avoid the voltage rise at the maximum resonance and to increase the power feeding efficiency.

Further, the resonant circuit including the power feeding side power feeding coil and the power feeding side resonant capacitor includes a tuning adjustment circuit that precisely adjusts the capacitance of the resonant capacitor of the power feeder or the inductance of the power feeding coil. The power feeding coil of the power feeder is composed of a coil with 1 to 5 turns or less, and a size of the coil of the power feeding coil is larger than a size of the power reception coil of the power receiver.

Accordingly, it is possible to avoid the voltage rise at the maximum resonance and to increase the power feeding efficiency.

The power feeding coil of the power feeder and the power feeding side resonant capacitor constitute a parallel resonant circuit, and the power reception coil of the power receiver and the power reception side resonant capacitor constitute either the parallel resonant circuit or a series resonant circuit.

Accordingly, it is possible to avoid the voltage rise at the maximum resonance and to increase the power feeding efficiency.

The power feeding circuit unit of the power feeder further includes a driving time adjustment circuit that adjusts a driving time in which a driving current is provided to the power feeding coil to ¼ or less of a resonance frequency period of the power receiver, and the driving time adjustment circuit adjusts the distortion so that in consideration of a power feeding range to be obtained, a power feeding distance, and specifications of the power feeding coil and the power reception coil, the power feeding efficiency increases in the range of the driving time.

Accordingly, it is possible to avoid the voltage rise at the maximum resonance and to increase the power feeding efficiency.

The system further includes a tuning adjustment circuit that adjust a coupling coefficient (K) of the power feeding coil of the power feeder and the power reception coil of the power receiver to a range of 0.3 (30%) or less or close to K=0.3 (30%), the tuning adjustment circuit adjusts the distortion with the coupling coefficient and the driving time so that in consideration of a required power feeding range, a power feeding distance, and specifications of the power feeding coil and the power reception coil, a power feeding efficiency increases in the driving time.

Accordingly, it is possible to avoid the voltage rise at the maximum resonance and to increase the power feeding efficiency.

The system further includes a frequency adjustment circuit for changing a resonance frequency of the power feeder, a resonant state sensor, and a control circuit, the resonant state sensor includes a voltage sensor and a current sensor connected to the control circuit and a phase detection circuit for detecting a phase according to inputs of the voltage sensor and the current sensor. The control circuit collectively controls both of the power feeding circuit unit and the frequency adjustment circuit to adjust a driving pulse time to adjust a power feeding side resonance frequency period based on an output of the resonant state sensor so that resonance frequency or power feeding capability (power) provides the high power feeding efficiency, and adjusts a power feeding side resonant capacitor or changes a power feeding coil pattern.

Accordingly, it is possible to avoid the voltage rise at the maximum resonance and to increase the power feeding efficiency.

When it is determined that it is an abnormal resonance state based on information from the resonant state sensor, the control circuit of the power feeder stops the driving pulse in a normal state to temporarily bring the power feeding efficiency close to zero and moves to a stop or standby state (sleep state) of the power feeding.

Accordingly, it is possible to avoid the voltage rise at the maximum resonance and to increase the power feeding efficiency.

The control circuit of the power feeder supplies power at a predetermined intermittent or weaker output than usual in the standby state (sleep state), and makes a determination based on an output of the resonant state sensor and returns to the normal state when the power receiver is in a power feedable state.

Accordingly, it is possible to avoid the voltage rise at the maximum resonance and to increase the power feeding efficiency.

The system further includes a power feeder complex in which a plurality of power feeders, each including the power feeding coil, the power feeding side resonant capacitor, the switch circuit and the control circuit, is arranged in parallel, and a collective control circuit for collectively controlling the control circuit of the plurality of power feeders forming the power feeder complex. The collective control circuit controls the state of the plurality of power feeders, that is, the stop state, standby state (sleep state), and normal state of the power feeding.

Accordingly, it is possible to increase the degree of freedom for designing the power feeding range such as a positional relationship between the power feeder that can be fed and the power receiver, a distance, a height, and an area.

The collective control circuit sets a specification of each power feeding coil, resonance frequency, and a specification of the driving time to use each of the plurality of power feeders constituting the power feeder complex with changed power feeding distance, power feeding range, and power feeding capability, and controls the state of the plurality of power feeders, that is, the stop state, standby state (sleep state), and normal state of the power feeding, based on the information from the resonant state sensor installed in each of the power feeders.

Accordingly, it is possible to increase the degree of freedom for designing the power feeding range such as a positional relationship between the power feeder that can be fed and the power receiver, a distance, a height, and an area.

The power feeder includes a power feeding side communication means for transmitting and receiving transmission data by changing an amplitude of a carrier wave in response to a bit sequence of transmission data, which is a digital signal, the power receiver has information determined by individual identification (ID) and a state sensor, the power feeding side communication means obtains the individual identification and state recognition of the power reception side, the power feeding side control circuit adjusts a foreign object detection countermeasure and the driving pulse time for increasing the power feeding efficiency, and adjusts the resonance frequency that adjusts the resonant capacitor or changes the power feeding coil pattern.

Accordingly, it is possible to avoid the voltage rise at the maximum resonance and to increase the power feeding efficiency.

The power receiver has variable output power information related to a required output power, the power feeding side communication means receives the output power information of the power receiver, the power feeder further includes a driving time dialogue adjustment circuit for responsively controlling the driving time of the power feeder to be a power required for the power receiver in a range of ¼ or less of the resonance frequency period of the power receiver in accordance with the output power information received by the power feeding side communication means or a required power information.

Accordingly, it is possible to avoid the voltage rise at the maximum resonance and to increase the power feeding efficiency.

The system further includes an information storage device that in response to changing a distance (L) between the power feeding coil and the power reception coil, stores data obtained by an experiment in advance about whether a frequency characteristic of a power transmission efficiency from the power feeding coil to the power reception coil becomes a single tuned characteristic or a double tuned characteristic, and in the case of the double tuned characteristic, how much recess is made between the two tunes constituting the double turns of the double tuned characteristic. The tuning adjustment circuit precisely adjusts the capacitance of the power feeding side resonant capacitor or the impedance of the power feeding side coil with reference to the data stored in the information storage device, so that the frequency characteristic of the power transmission efficiency from the power feeding coil to the power reception coil continues to be the single tuned characteristic even when the distance between the power feeding coil and the power reception coil is changed, or even in the case of the double tuned characteristic, the power transmission efficiency in the recess between the two tunes constituting the double tuned characteristic is set to be 90% or more of the power transmission efficiency in the lower tune among the two tunes.

Accordingly, it is possible to avoid the voltage rise at the maximum resonance and to increase the power feeding efficiency.

The tuning adjustment circuit includes a single or plurality of other parallel-connected capacitors, and adjusts the capacitance of the power feeding side resonant capacitor by using the single or plurality of capacitors.

Accordingly, it is possible to avoid the voltage rise at the maximum resonance and to increase the power feeding efficiency.

The switch circuit turns on the driving pulse signal at a timing when a resonant coil voltage becomes near a zero value, maintains the resonant coil voltage near the zero value while the driving pulse signal is on, and controls the driving current with the resonant coil current as an upper limit to flow while the driving pulse is on.

Accordingly, it is possible to avoid the voltage rise at the maximum resonance and to increase the power feeding efficiency.

A distortion component of the resonant coil current generated by the driving current of the power feeder is taken as a magnetic flux fluctuation of the power feeding coil due to the distortion component, and the energy generated in the power reception coil of the power receiver by the electromagnetic induction is recovered in the power reception circuit so that energy transferring from the power feeding circuit to the power reception circuit is implemented.

Accordingly, it is possible to avoid the voltage rise at the maximum resonance and to increase the power feeding efficiency.

The power feeding coil of the power feeder is composed of a coil with 1 to 5 turns or less, and a size of the coil of the power feeding coil is larger than a size of the power reception coil of the power receiver.

Accordingly, it is possible to avoid the voltage rise at the maximum resonance and to increase the power feeding efficiency.

The power feeding coil of the power feeder and the power feeding side resonant capacitor constitute a parallel resonant circuit matched to a predetermined resonance frequency, and the power reception coil of the power receiver and the power reception side resonant capacitor constitute either the parallel resonant circuit or a series resonant circuit.

Accordingly, it is possible to avoid the voltage rise at the maximum resonance and to increase the power feeding efficiency.

A driving time of the power feeder, that is, a time during which a driving pulse is on, is ¼ or less of a resonance frequency period of the power receiver, and the wireless power feeding system further comprises a driving time adjustment circuit that adjusts the driving time so that a power feeding efficiency and an output power of the power receiver increase within the range in consideration of a power feeding range to be obtained, a power feeding distance, and specifications of the power feeding coil and the power reception coil.

Accordingly, it is possible to avoid the voltage rise at the maximum resonance and to increase the power feeding efficiency.

The tuning adjustment circuit determines the power feeding range, the power feeding distance and the specifications of the power feeding coil and the power reception coil so that a desired power feeding efficiency and the output power of the power receiver are greater than or equal to a predetermined value in a range of the coupling coefficient (K) of the power feeding coil of the power feeder and the power reception coil of the power receiver of 0.3 (30%) or less or the coupling coefficient (K) close to K=0.3 (30%), or adjusts the inductance of the power feeding coil so that the power feeding efficiency becomes high in the driving time.

Accordingly, it is possible to avoid the voltage rise at the maximum resonance and to increase the power feeding efficiency.

The system further includes a frequency adjustment circuit for changing a resonance frequency of the power feeder and a resonant state sensor, the resonant state sensor includes a voltage sensor and a current sensor connected to the control circuit and a phase detection circuit for detecting a phase according to inputs of the voltage sensor and the current sensor. The control circuit collectively controls both of the switch circuit and the frequency adjustment circuit to adjust a driving pulse time to adjust a power feeding side resonance frequency period based on an output of the resonant state sensor so that the resonance frequency or power feeding capability (power) provides the high power feeding efficiency, and adjusts the resonant capacitor or changes a power feeding coil pattern.

Accordingly, it is possible to avoid the voltage rise at the maximum resonance and to increase the power feeding efficiency.

When it is determined that it is an abnormal resonance state based on information from the resonant state sensor, the control circuit of the power feeder stops the driving pulse in a normal state to temporarily bring the power feeding efficiency close to zero and moves to a stop or standby state (sleep state) of the power feeding.

Accordingly, it is possible to avoid the voltage rise at the maximum resonance and to increase the power feeding efficiency.

The control circuit of the power feeder supplies power at a predetermined intermittent or weaker output than usual in the standby state (sleep state), and makes a determination based on an output of the resonant state sensor and returns to the normal state when the power receiver is in a power feedable state.

Accordingly, it is possible to avoid the voltage rise at the maximum resonance and to increase the power feeding efficiency.

The system further includes a power feeder complex in which a plurality of power feeders, each including the power feeding coil, the power feeding side resonant capacitor, the switch circuit and the control circuit, is arranged in parallel, and a collective control circuit for collectively controlling the control circuit of the plurality of power feeders forming the power feeder complex. The collective control circuit controls the state of the plurality of power feeders, that is, the stop state, standby state (sleep state), and normal state of the power feeding.

Accordingly, it is possible to avoid the voltage rise at the maximum resonance and to increase the power feeding efficiency.

The collective control circuit sets a specification of each power feeding coil, resonance frequency, and a specification of the driving time to use each of the plurality of power feeders constituting the power feeder complex with changed power feeding distance, power feeding range, and power feeding capability, and controls the state of the plurality of power feeders, that is, the stop state, standby state (sleep state), and normal state of the power feeding, based on the information from the resonant state sensor installed in each of the power feeders.

Accordingly, it is possible to avoid the voltage rise at the maximum resonance and to increase the power feeding efficiency.

The power feeder includes a power feeding side communication means for transmitting and receiving transmission data by changing an amplitude of a carrier wave in response to a bit sequence of transmission data, which is a digital signal, the power receiver has information determined by individual identification (ID) and a state sensor, the power feeding side communication means obtains the individual identification and state recognition of the power reception side, the power feeding side control circuit adjusts a foreign object detection countermeasure and the driving pulse time for increasing the power feeding efficiency, and adjusts the resonance frequency that adjusts the resonant capacitor or changes the power feeding coil pattern.

Accordingly, it is possible to avoid the voltage rise at the maximum resonance and to increase the power feeding efficiency.

The power receiver has variable output power information related to a required output power, the power feeding side communication means receives the output power information of the power receiver, the power feeder further includes a driving time dialogue adjustment circuit for controlling the driving time of the power feeder in the resonance frequency period range of the power receiver in accordance with the output power information received by the power feeding side communication means.

Advantageous Effects

In the wireless power feeding system of the present invention, the wireless power feeding employs a parallel resonant circuit on the power feeding side by the driving method of the power receiver and the adjusting method of the resonance frequency, and low loss and relatively low heat generation, etc. can be made. In addition, it possible to send energy to the power reception device with high power feeding efficiency at a power feeding distance. Moreover, since it exhibits high power feeding efficiency at a low coupling coefficient, the feeding range and feeding distance could be improved compared to the wireless power feeding using the conventional series resonant circuit. Moreover, it is an optimal power feeding system for wireless power feeding to a plurality of power receivers at the same time.

DETAILED DESCRIPTION OF THE INVENTION

Hereinafter, preferred embodiments for realizing a system of the present invention will be described in detail with reference to the accompanying drawings.

Figure 1:
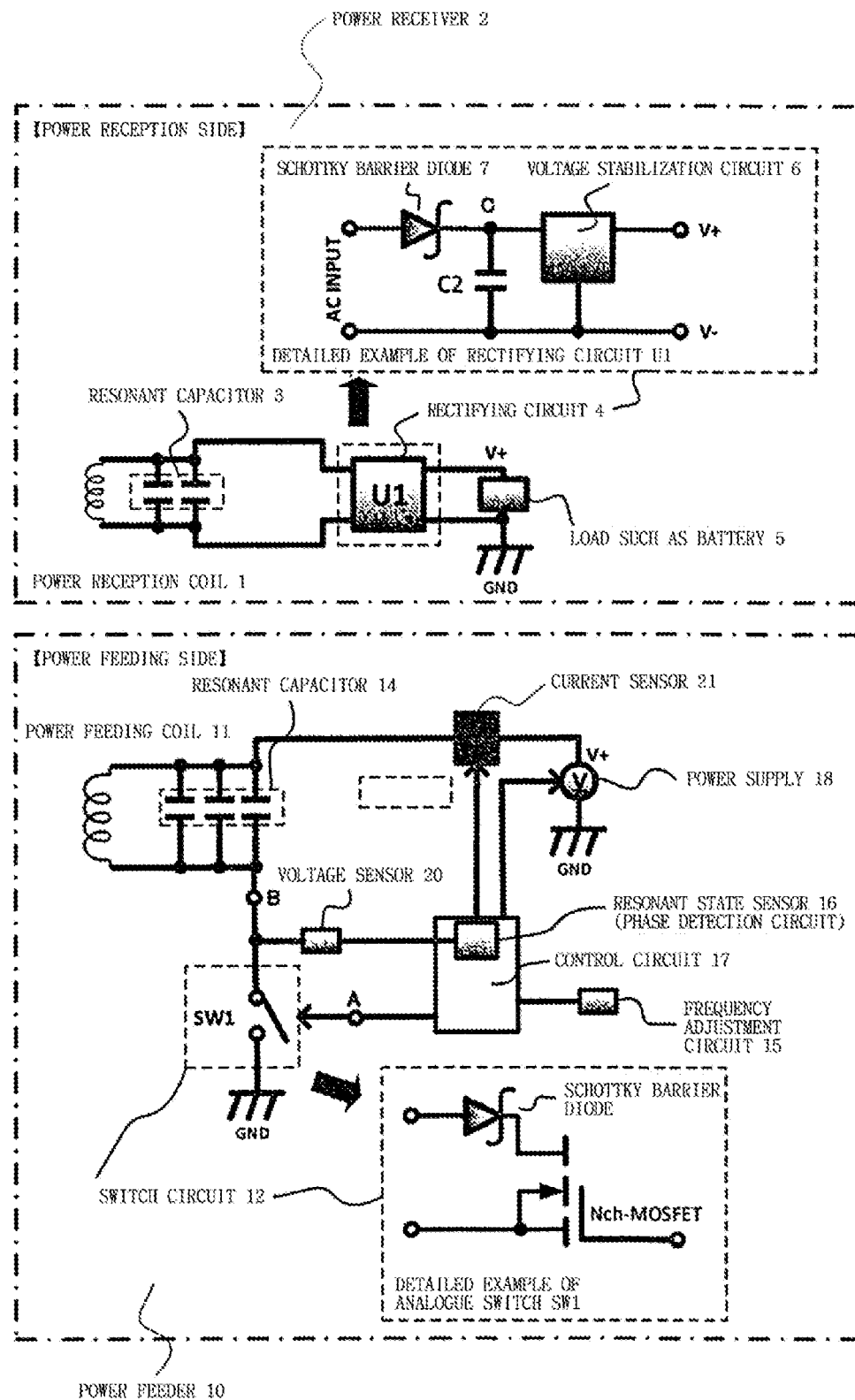
FIG. 1 is a basic circuit configuration diagram of a wireless power feeding system of the present invention.

FIG. 1 is a diagram illustrating a basic circuit configuration diagram of a wireless power feeding system according to the present invention.

The wireless power feeding system according to the present invention is configured to include a combination of a power feeder 10 and a power receiver 2. Electrical energy is supplied from the power feeder 10 to the power receiver 2.

As shown in FIG. 1, the power receiver 2 is configured to include a power reception coil 1, a power reception side resonant capacitor 3, a rectifying circuit 4, and a load 5 such as a battery. The resonant capacitor 3 is constituted by a single or a plurality of capacitors in parallel.

There are several characteristics of the power receiver 2 side.

First, the load 5 such as any battery is mounted on the power receiver 2.

Second, the size, material, and electrical specifications of the power reception coil 1 installed in the power receiver 2 and the power feeding coil 11 of the power feeder 10 are designed to correspond to a power feeding range, a power feeding distance, and a power feeding capability.

Third, the power reception coil 1 and the power reception side resonant capacitor 3 of the power receiver 2 are composed of a so-called resonator (LC resonant circuit), and have a specification that provides good characteristics at a predetermined resonance frequency (the same applies to the power feeding coil 11 and the power feeding side resonant capacitor 14 of the power feeder.)

Fourth, when the power receiver 2 is a parallel resonant circuit, the rectifying circuit may be half-wave rectification.

In the present invention, since the difference between the permitted resonant frequencies is large, it is possible to sufficiently realistically respond to variations in the electrical characteristics of the product, so-called yield target. Therefore, it may also determine the resonance frequency for each model.

The power feeder 10 includes the power feeding coil 11, the resonant capacitor 14 constituting a resonant circuit together with the power feeding coil 11, a switch circuit 12 for turning on and off power to the power feeding coil 11, and a control circuit 17 for operating the switch circuit 12. The resonant capacitor 14 is constituted by a single or a plurality of capacitors in parallel. A frequency adjustment circuit 15 (for example, a circuit including a PLL circuit) is connected to the control circuit 17 for making on/off timing of the switch. There is a resonant state sensor 16 that is a type included in the control circuit 17, and detects a resonant state. It is constituted by, for example, a phase detection circuit. A current sensor 19 and a voltage sensor 20 are connected to the resonant state sensor 16. In addition, the power supply 18 for supplying power to the power feeding coil 11 and supplying power required for each circuit is installed in the power feeder 10.

The characteristics of the power feeder 10 side are listed.

First, the power feeding coil 11 and the resonant capacitor 14 constitute a parallel resonant circuit.

Second, there is only one switch circuit. When this switch is on, it is called a driving state, and when it is turned off, it is called a resonant state.

Third, a control circuit 17 uses the timing of a frequency adjustment circuit 15, controls the switch circuit 12, and controls the timing of the driving state and the resonant state.

Fourth, the control circuit 17 has the resonant state sensor 16 that detects a resonant state (mainly a difference in frequency), and controls the stop of the power feeding and the adjustment of the resonance frequency based on the detection result of the resonant state sensor 16.

FIG. 1 shows a basic circuit diagram (it is more likely a block diagram). The basic circuit is provided with the power feeding coil 11 that generates magnetic flux to generate electromagnetic induction. The electric circuit of the power feeder 10 is provided with at least the power feeding side resonant capacitor 14 and the power supply 18, and creates a resonance relationship of a constant frequency with respect to the power reception coil 1 of the power receiver 2. The frequency at this time is called a resonance frequency, and a frequency of 100 kHz to 300 kHz, which is generally called a long wave having little effect on the human body, is used. If this is referred to as a reference resonance frequency, the reference resonance frequency used in the present invention is not particularly limited. On the other hand, the resonance frequency of the power feeding side and the resonance frequency of the power reception side, which will be described later, are usually set to the same resonance frequency, but an important feature of the present invention is that the resonance frequency is set to a different resonance frequency based on a predetermined timing time.

In the positional relationship and state of the power receiver 2, there is a slight difference in the resonance frequency. For example, the position and inclination of the power reception coil 1 of the power receiver 2 are gradually changed. Therefore, if the power reception coil 1 enters within the range of the magnetic flux transmitted from the power feeding coil 11, energy can be supplied. At this time, the coefficient indicating the degree of the magnetic coupling between the coil windings is generally called a coupling coefficient (K). The present invention is also characterized in the method for determining a predetermined coupling coefficient for increasing a power feeding efficiency.

When the power reception coil 1 enters the magnetic flux, it affects the power feeding side in the form of a difference in resonance frequency. If the resonance frequency is out of line, the efficiency of energy supply decreases.

Therefore, the frequency and phase shifted are detected by the resonant state sensor 16 (e.g., a circuit including a phase detection circuit), and the resonance frequency of the power feeding coil 11 is adjusted according to the frequency and phase. For example, adjustment can be made by changing the resonant capacitor 14.

This adjustment is also referred to as tuning, and there are methods that are performed at the time of manufacturing and those that are automatically controlled by an adjustment circuit during operation, but they are collectively referred to as a tuning adjustment circuit. The resonant capacitor is composed of a single or a plurality of capacitors, but the simplest tuning method is to connect several capacitors in parallel in advance and make the unnecessary capacitors pattern-cut and invalid during manufacturing so that it is adjusted to a predetermined resonance frequency. Also, there is a method of placing a trimmer capacitor, a variable capacitor, etc. and manually adjusting it with a control knob.

In addition, as a method of automatically controlling by the control circuit during operation, there is a method of making a predetermined resonance frequency by connecting a pair of various capacitors and switches in parallel in advance and controlling the switches connected in series to each capacitor by the adjustment circuit. In addition, as another method, there is a method of installing a servomotor on the control knob of a variable capacitor and making a predetermined resonance frequency by the adjustment circuit controlling the servomotor.

On the other hand, on the power reception side, there are many cases where adjustment is performed at the time of manufacturing, but the method of measuring the inductance of the power reception coil in advance and mounting a corresponding capacitor to an unmounted part can be called the tuning adjustment circuit in a broad sense.

If capacitors are connected in parallel, internal resistance is reduced and heat generation is further suppressed.

In addition, the frequency adjustment circuit 15 can adjust the power feeding capability (power) by, for example, lengthening or shortening the driving state time by a circuit having a built-in phase-locked loop (PLL) circuit. In some cases, it may be a case where a plurality of feeding coils 11 is provided and the resonance frequency is changed by switching the coils. Here, it is the characteristic of the present invention that the adjustment value of the optimum resonance frequency by frequency adjustment is set to a resonance frequency of a misaligned form based on a predetermined timing time to be described later.

It is necessary to add several factors to the adjustment of the frequency (or phase). Therefore, it is preferable to install the control circuit 17 that performs controlling by a program using a microcontroller (integrated circuit including processor, memory, and peripheral circuits) or programmable logic device (integrated circuit that can define and change internal logic circuits), etc. The control circuit 17 is connected to the resonant state sensor 16 (phase detection circuit). The resonant state sensor 16 detects the frequency difference and the phase difference and transmits the signal to the control circuit 17. Therefore, when an object other than the predetermined power receiver 2 approaches, the resonant state sensor 16 detects an abnormal frequency and phase and transmits the signal to the control circuit 17, and the control circuit 17 applies on the power supply 18 to stop the power feeding.

The wireless power feeding system of the present invention is configured as the basic circuit shown in FIG. 1. The position of the resonant capacitor 14 of the power feeder 10 is connected in parallel with the power feeding coil 11. A circuit in which the resonant capacitor 14 is disposed is generally called a parallel resonant circuit. On the other hand, in the frequently used wireless power feeding system, a series resonant circuit is formed, and the position of the resonant capacitor is arranged in series with the coil.

In the case of such a parallel resonant circuit, when SW1 is turned off after turning on SW1 to become a stable resonant state, the power feeder 10 maintains the resonant state with the power receiver 2 while the energy stored in the power reception coil 1 and the capacitor 3 is released. Here, based on the transition of the resonant state detected by the resonant state sensor 16 connected in parallel with the power feeding coil 11, the control circuit 17 implements the power supply of suitable frequency through the resonant capacitor and the timing control of a driving state by the frequency adjustment circuit (PLL circuit) 15. Such resonant state sensor 16 is a sensor for detecting a resonant state, and detects a voltage, a current transition and a phase detection of a resonance frequency.

It is difficult to clearly understand the phase difference of the resonance frequency of the power receiver 2 of FIG. 1. However, by simulating various situations obtained from the resonant state sensor 16 in advance and programming based on the simulation, it is possible to make a simple decision on whether to increase or decrease the resonance frequency or maintain the resonance frequency. Furthermore, by detecting the result transition after the adjustment, it is possible to determine whether it is suitable or not, and to control by trial and error.

In addition, when the control circuit 17 controls and adjusts the resonant capacitor, a special component, such as a variable capacitor that can be precisely controlled (a capacitor that can change the capacitance by moving one of the electrodes), etc. is ideal, but as there are currently few parts realistically, even if it is used at a fixed frequency without the adjustment of the capacitor, it is possible to present a specification value that can sufficiently meet the needs.

In addition, a method of changing a plurality of coils may be also adopted.

In addition, the resonance frequency may be also adjusted by adjusting the driving time.

A detailed example of the switch circuit 12 of FIG. 1 is configured to include an N-channel MOSFET and a Schottky barrier diode. Moreover, the detailed example of the rectifying circuit 4 of the power receiver 2 is configured to include the capacitor, a voltage stabilization circuit 6, and a Schottky barrier diode 7. These are examples, and a suitable configuration may be made according to the product specification.

In addition, according to the present method, the inductance in the coil may be increased, and if possible, if the coil has a low resistance, the requirement is satisfied, and the effect such as low loss is high. Therefore, it is possible to produce a more effective effect if the number of turns is 1 to 5 turns and the coil used as a low-resistance material wire is combined with a corresponding resonant capacitor. In particular, in the case of the power feeding coil on the power feeder side, if the power feeding coil is larger in size than the power reception coil, high-efficiency power feeding to a plurality of power receivers is possible.

Figure 2:
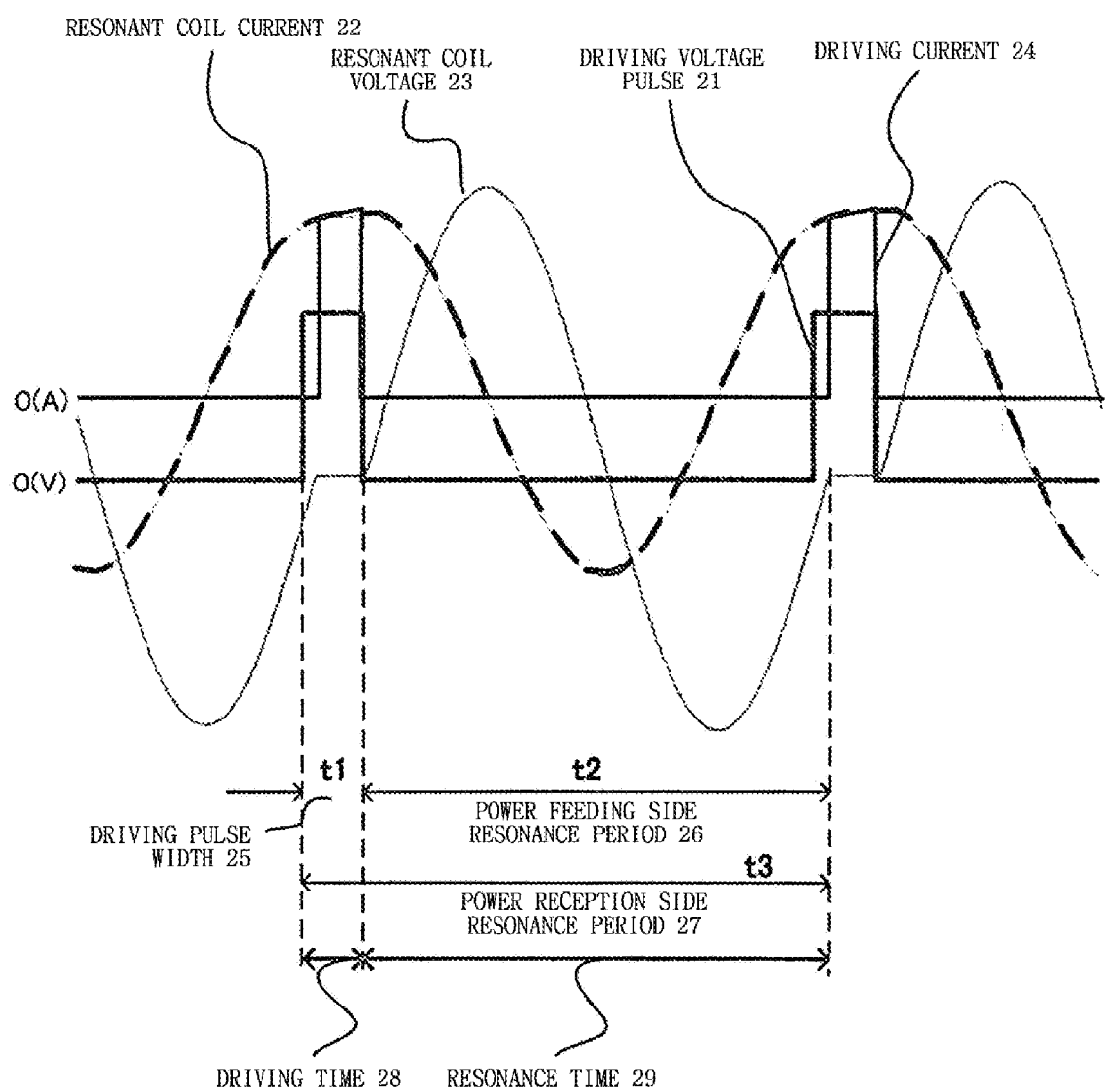
FIG. 2 is a basic waveform diagram of a power feeding side of the present invention.

FIG. 2 is a control pulse waveform of the switch circuit 12, which is a basic waveform diagram of the power feeder 10 shown in FIG. 1, and there is a driving voltage pulse 21. This driving voltage pulse is a waveform at point A in FIG. 1, and is undoubtedly a pulse generated by controlling the switch circuit 12 by the control circuit 17 at the timing of the frequency adjustment circuit 15. When the driving voltage pulse 21 is high, it is switched on. In other words, when the switch is turned on, the power of the power supply 18 is supplied to the resonant capacitor 14, so that it is in a driving state. This driving time 28 (t1) is called a driving pulse width 25.

The time when the switch is turned off and not driven is the resonant state, that is, the resonance time. The resonance time 29 (t2) is referred to as a power feeding side resonance period 26 (t2).

As shown in FIG. 1, in a case where the power feeding coil 11 and the resonant capacitor 14 constitute a parallel resonant circuit, if the power feeder 10 is in resonance with the power receiver 2 even in the driving state or in the resonant state, it is safe to say that it continues to supply energy. In other words, in the power reception side resonance period 27 (t3), the tuning adjustment circuit is adjusted such that the sum of the resonant state time (t2) of the power feeder and the driving state time (t1) is $0.9(t1+t2)=<t3=<1.1(t1+t2)$.

On the other hand, when viewed from the power feeding side, energy is actually supplied instantaneously in the driving state, but such a description will be described later.

While the switch of the switch circuit 12 is turned on, that is, the driving voltage pulse is being supplied, the resonant coil voltage 23 is set close to a zero value (it can be said that the driving voltage pulse is supplied at the timing near the zero value). Also, a resonant coil current 22 shows a distorted waveform as a result during the driving time 28. During the driving time 28, the resonant coil voltage 23 is in a zero state and the driving current 24 is flowing. The driving current 24 is a waveform at the point B in FIG. 1. Although the resonant capacitor 14 is accurately represented as an AC waveform with a phase difference of 90 degrees of the resonant coil current, the driving current 24 is a portion in which the power energy stored in the resonant capacitor 14 is changed.

If the current flows, the current in a form converted into magnetic flux output from the power feeding coil 11 acts on the power reception coil 1 of the power receiver 2, and electromagnetic induction occurs to recover energy, so the energy seems to have moved. This decrease in the amount of recovered energy is observed as distortion of the resonant coil current 22.

On the other hand, from the viewpoint of switch loss, the present invention also exhibits a superior characteristic. During the driving time 28, the resonant coil voltage 23 is in a state near zero, but at this time, when the voltage is applied about the time the switch circuit 12 is switched, a switching loss due to so-called switching occurs. Since it occurs due to the overlap of current and voltage, in the present invention, the resonant coil voltage 23 is switched in a state near zero, thereby minimizing switching loss. Moreover, since the driving current 24 flowing here never exceeds the resonant coil current 22, a peak waveform of high current is never generated. As a result, it is possible to suppress switching losses and stress, and since these losses can also be referred to as heat losses, they lead to the effect that heat is difficult to generate. Although it is similar to the general switching and ZVS method in a state where the voltage is zero, the present invention is a new method that is well utilized for the power feeding means of wireless power feeding.

In addition, in the graph of FIG. 2, the driving pulse is turned on before the resonant coil voltage 23 reaches the zero value. This turns on the driving pulse before the zero value, that is, near the zero value, because there is a delay in switching. Moreover, a slightly non-zero value has a resistance value in the switch circuit and appears as a voltage corresponding to that. Either way, this description has presented an essential way of the method.

The power energy supplied to the power receiver 2, that is, the supply capacity is expressed as the driving pulse width length of the driving voltage pulse 21 and the driving voltage pulse intensity during the driving time. In other words, if it is desired to increase the electric power to be supplied to the power receiver 2, it is implemented by increasing the driving pulse width 25 and increasing the driving voltage pulse 21. If it is desired to decrease the supply capacity, the opposite of the above can be conducted.

However, if the driving pulse width 25 is increased, the coupling with the power reception coil of the power receiver 2 becomes stronger, but if it becomes too strong, the efficiency deteriorates. Just because the driving pulse width is long does not mean that the effect is good. In addition, increasing the voltage of the driving voltage pulse 21 has a certain limit because the withstand voltage of various electronic components is required and is not realistic. So, by itself, the design limit of the power desired by the power receiver begins to be established. In addition to the driving pulse width, the specifications of the power feeding coil 11 and the power reception coil 1 are largely related, and the specifications of the power feeding range and power feeding distance are also related, and thus, the specifications of the driving voltage pulse and the driving pulse width are determined by the balance of these comprehensive parameters.

In addition, if the specification of the driving pulse width is determined, the design value as a resonator of the power feeding coil 11 and the resonant capacitor 14 of the power feeder 10, that is, the resonance frequency can be determined. The resonance frequency of the power feeder 10 is determined by the period time of the power feeding side resonance period 26. On the other hand, in the power receiver 2, it can be determined as the period time of the power reception side resonance period 27, which is the sum of the driving pulse width 25 and the period time of the power feeding side resonance period 26. From this, in the present invention, the resonance frequency of the power feeder 10 and the resonance frequency of the power receiver 2 are adjusted with a predetermined difference, which is a matter that best shows the characteristics of the present invention.

Figure 3:
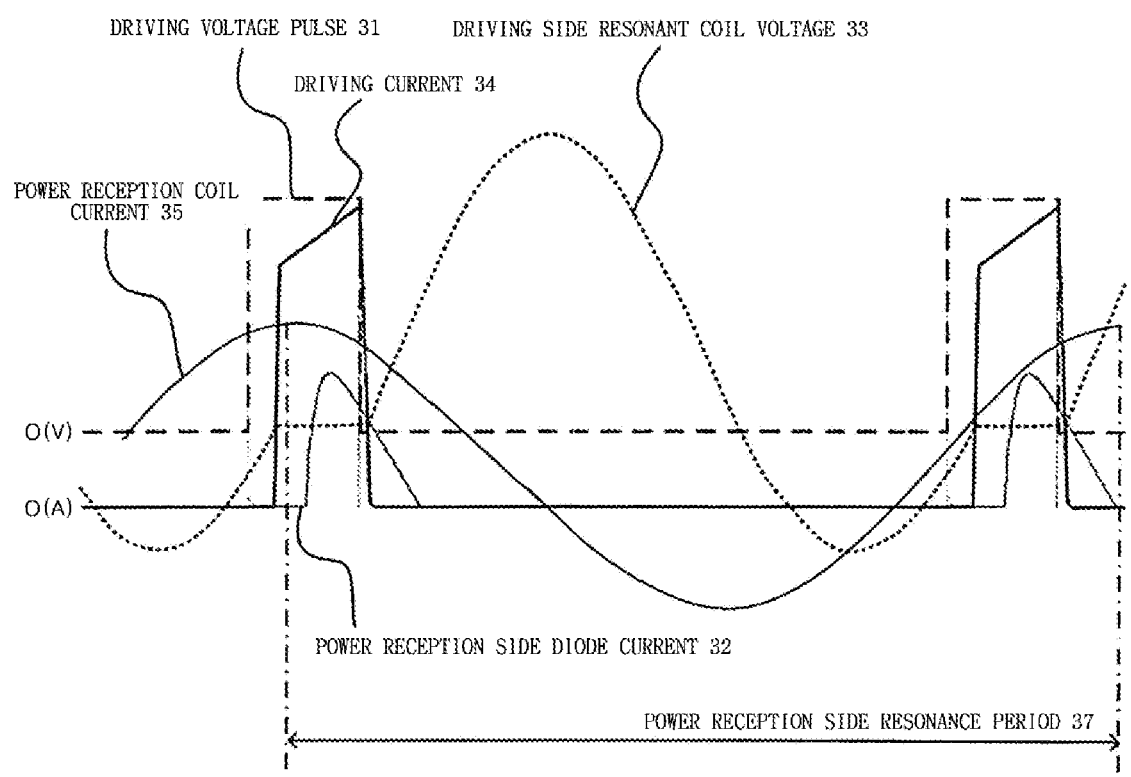
FIG. 3 is a basic waveform diagram of a power reception side of the present invention.

FIG. 3 is a basic waveform diagram of the power reception side of the present invention. The driving voltage pulse 31, the driving current 34, and the driving side resonant coil voltage 33 among the waveforms on the power feeding side of FIG. 2 are superimposed. The driving current 34 flows and then, after a predetermined delay time, the power reception side diode current 32 flows. The power reception side diode current 32 is a waveform at point C in FIG. 1. This current is the input current of the Schottky barrier diode 7 of the power reception side rectifying circuit 4. When the resonance is in a steady state and the driving current 34 flows to the power feeding coil 11, the power reception coil 1 is electromagnetically induced by electromagnetic induction, and the input current of the power reception side rectifying circuit, that is, the power reception side diode current 32 reaches peak during the driving time. Power can be extracted by rectifying this current and connecting it to a load. The power reception coil current 35 simply represents the power reception side resonance frequency period. In other words, the power reception side resonance period 37 is a period obtained by adding the time of the driving voltage pulse 31 to the resonance frequency period of the driving side resonant coil voltage 33. That is, it can be found that it satisfies the condition of $0.9\ (t1+t2) \leq t3 \leq 1.1\ (t1+t2)$.

The principles of the present invention will be described in more detail. When the switch (SW1 in FIG. 3) of the switch circuit 12 of the power feeder 10 is turned on, the current flowing from the power supply 18 flows into the resonant capacitor 14. In other words, the resonant capacitor is in a state of being charged. The current at this time becomes the driving current and flows to the power feeding coil 11 in a state where the resonant coil voltage is close to zero. Accordingly, although the energy transfer is in a balanced state (a state in which the energy does not appear to be transferred from the outside) during the resonant state of the parallel resonant circuit, the energy transfers more by the distortion of the current flow. This transfer of energy is the principle in the wireless power feeding of the present invention.

On the other hand, when the switch circuit 12 is turned off, the electric power charged in the resonant capacitor becomes a current, flows into the power feeding coil 11 in a closed circuit system, and forms an ideal resonant state with the power reception coil 1 of the power receiver 2. Even at this time, magnetic flux is generated by the power feeding coil 11 to induce electromagnetic induction in the power reception coil 1 of the power receiver 2, but in such a resonant state, the stronger the resonant state (also called a normal state), the more almost no energy is transferred from the outside. In general, it is said that wireless power feeding is not possible in a parallel resonant circuit. In this regard, a magnetic flux having a phase difference of 90 degrees from the magnetic flux transmitted from the power feeding coil 11 is generated in the power reception coil 1 of the power receiver 2, and thus the coupling is inhibited. In addition, in the perfect resonant state, the mutual currents are canceled at the resonance frequency, and the impedance appears infinite from the outside, and the flowing current becomes very small. In this case, since the energy stored as electric power inside the capacitor and the energy stored as magnetic force inside the coil move with each other inside the system, when viewed from the outside, the energy is not in and out. Therefore, in the resonant state, energy cannot be transferred or it is in a state in which it is difficult to transfer.

On the other hand, the waveform of the power receiver 2 is a state in which the resonant coil current and the resonant coil voltage are out of phase by 90 degrees, and a relatively neat resonance waveform is displayed according to the power reception side resonance period 27. In addition, when the current following in the power feeder 10 during the driving time 28 is changed to the magnetic flux, and then the power reception coil 1 receives it, it appears as a current. When a load is applied from this current, it becomes possible to extract it as power.

Regarding a method for determining a pulse width in the driving pulse width 25 at the driving time 28, if the resonance frequency of the power receiver 2 is, that is, a duty ratio that is about ¼ or less of the resonance period, it is known high power feeding efficiency is obtained. The power feeding ability (electric power that can be fed) is almost maximum when the driving pulse width 25 is the duty ratio of about 16%. In the duty ratio of 16% to 25%, the power consumption increases, but the increase in the power feeding ability is small. Also, even if it is too low, the power feeding ability does not increase. As a result, when the driving pulse width 25 is controlled with the duty ratio of about 5% to 16%, it becomes possible to control the power feeding capability (electric power that can be fed) to be low or high.

For example, if the duty ratio is controlled in response to the power reception side output power information or required power information to be required, power can be fed in response to the power required by the power reception side.

For example, the power receiver can be controlled with the duty ratio in response to the adjustment of the amount of light with a light device or the state of charge of the battery (power decreases when fully charged, etc.).

If the driving time is too long or the coupling coefficient is high, the balance of the resonant state is broken, for example, the resonant coil voltage becomes very high, which causes damage to the electronic component. In the present invention, it is also an important factor to appropriately determine such a coupling coefficient, and it is assumed that about K=0.05 to 0.3 (5% to 30%) is the range of the power feeding efficiency for efficient energy transfer. Among them, about K=0.16 (16%) shows a peak value. In other words, it is good to determine the specifications of the driving pulse width, the specifications of the power feeding coil 11 and the power reception coil 1, and the specifications of the power feeding range and the power feeding distance so that the coupling coefficient becomes such a coupling coefficient.

Figure 4:
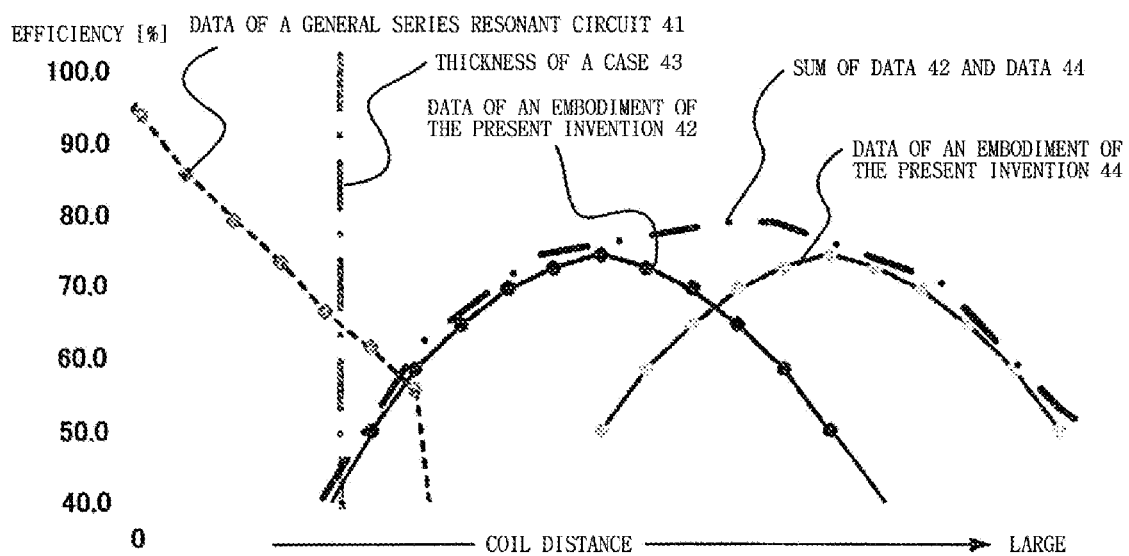
FIG. 4 is an exemplary graph of a power feeding distance and a power feeding efficiency.
Figure 5:
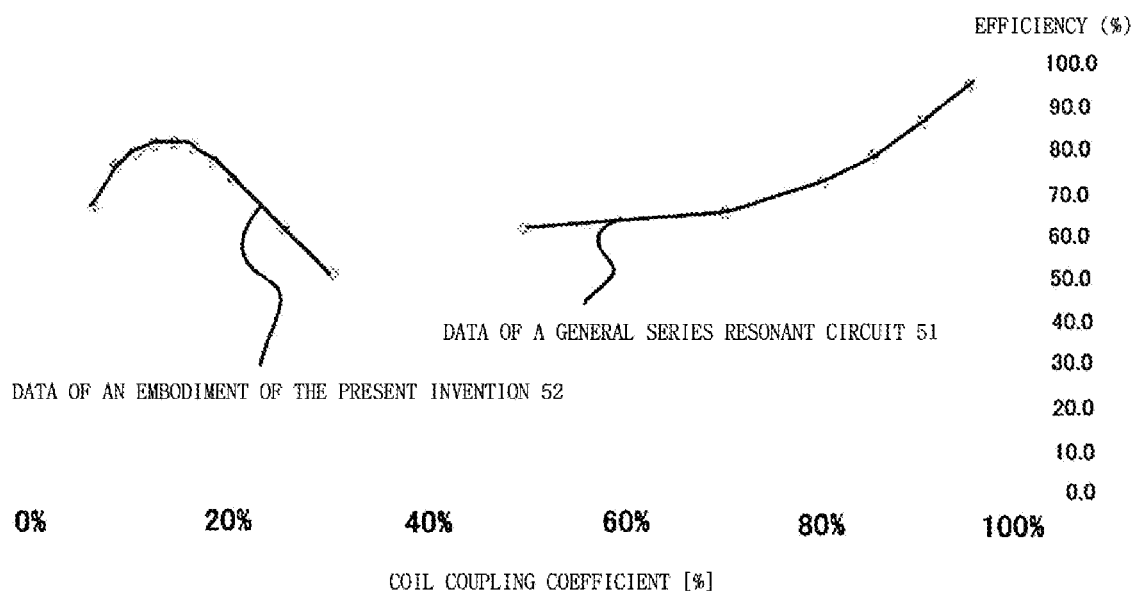
FIG. 5 is an exemplary graph of a power feeding coefficient and a power feeding efficiency.

In addition, the coupling coefficient is largely related to the coupling distance. FIG. 4 is an exemplary graph of the power feeding distance and the power feeding efficiency. FIG. 5 is an exemplary graph of the coupling coefficient and the power feeding efficiency.

In other words, as shown in the data 51 of the general series resonant circuit of FIG. 5, the higher the coupling coefficient, the higher the coupling efficiency. This indicates that the power feeding distance is zero at the position where the power feeding efficiency of the data 41 of the general series resonant circuit of FIG. 4 is high. That is, when the distance between the power feeding coil 11 and the power reception coil 1 is close, the coupling coefficient becomes high and when it is farther away, the coupling coefficient becomes small. However, in a general series resonant circuit, the higher the coupling coefficient, the more energy can be transferred. For this reason, the closer the distance between the power feeding coil 11 and the power reception coil 1 is, the higher the energy feeding efficiency is.

On the other hand, in the present invention, since, as shown in the data 52 of an example of the present invention of FIG. 5, the power feeding efficiency is high when the coupling coefficient is relatively low, K=0.05 to 0.3 (5% to 30%), when the power feeding coil 11 and the power reception coil 1 are placed at a certain distance, as shown in the data 42 and 44 of an example of the present invention of FIG. 4, high power feeding efficiency can be achieved.

Figure 6:
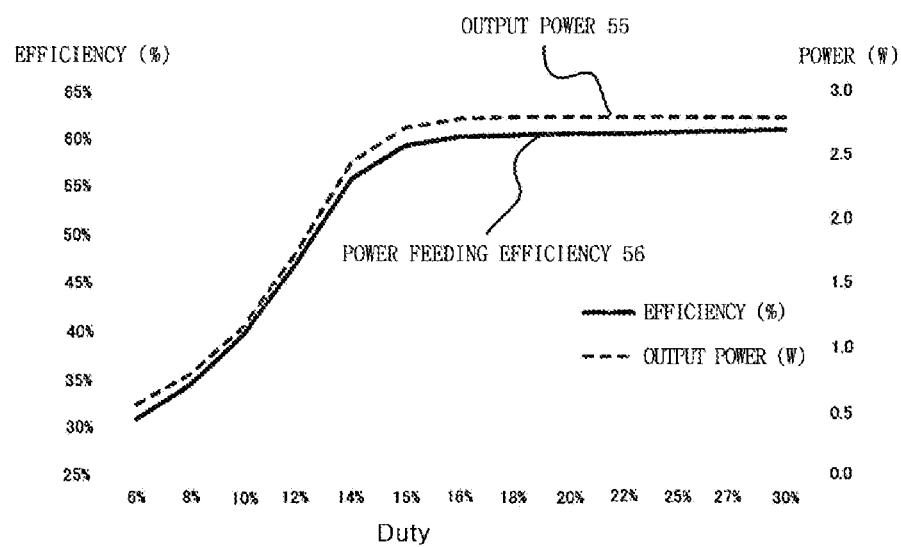
FIG. 6 is an exemplary graph of power feeding efficiency, output power, and coupling coefficient.

FIG. 6 shows an exemplary graph of the power feeding efficiency, the output power, and the coupling coefficient. It can be seen that both power feeding efficiency and output power can be maintained at high values in the range where the duty of the driving pulse is 15% to 30%.

In the data 41 of the general series resonant circuit, when the distance between the power feeding coil 11 and the power reception coil 1 is the closest, the high power feeding efficiency is shown. However, since the wireless power feeding product is in fact cased, the power feeding distance for the thickness of the case 43 is required. Therefore, it cannot but be said that there is no case applicable to actual products at the power feeding distance where the power feeding efficiency of the general series resonant circuit is the highest. The present invention is a practical invention in that it shows the high power feeding efficiency at a constant distance.

Similarly, when the power feeding coefficient is relatively low, it is possible to make the power feeding coil 11 larger than the power reception coil 1 by using the advantage of high power feeding efficiency. Since the coupling coefficient is related to the magnetic flux entering the power reception coil 1, even if the size of the reception coil is difficult to receive the magnetic flux, it is good if the coupling coefficient is appropriate. In this case, it becomes possible to increase the power feeding distance by the size of the power feeding coil 11. In addition, it is possible to facilitate wireless power feeding to a plurality of power receivers by effectively utilizing the unused magnetic flux.

In the case of a conventional general wireless power feeding device, the power reception side 2 is provided with a frequency detection circuit and a communication means for the power feeder 10 indicating the state of the power receiver 2 in many cases. The state is transmitted to the power feeder 10 by the communication means, and the power feeder 10 has a structure in which the resonance frequency is appropriately adjusted. In this case, a predetermined IC circuit is required for the power receiver 2.

On the other hand, in the present invention, the circuit of the power receiver 2 is configured in a structure that is as simple as possible. Since it is possible to discharge while charging by such a simplified configuration, it becomes possible to charge by the wireless power feeding system with a charger installed inside the electronic device, and to supply power by discharging to the electronic device at the same time.

In addition, if the resonant state sensor 16 composed of the current sensor 19 and the voltage sensor 20 of the power feeder 10 is reviewed in detail, it is possible to detect whether the power receiver 2 is in the power feeding state by its fluctuation, etc. After whether or not the power receiver 2 is present is determined, a measurement such as a sleep state, that is, stopping the power supply 18 by the control circuit 17 or shortening the driving time at the timing of the frequency adjustment circuit 15 can be taken.

In addition, there are cases where an overvoltage is applied to the power feeding side at the moment when the power receiver is out of the power feeding range. In order to prevent this directly, if the driving pulse width is made to zero as overvoltage protection from similar detection, the power feeding efficiency can be approached to zero and the power feeding can be temporarily invalidated.

The present invention may include a communication means from the power feeder 10 to the power receiver 2. For example, transmission data is transmitted/received by changing the amplitude of a carrier wave in response to a bit sequence of transmission data, which is a digital signal, in a modulation method called an ASK method, for example, amplitude shift modulation or amplitude shift keying. If this communication means is used, a unique ID is given to the power receiver 2, and when power is transmitted to the power feeder 1 in power feeding, the unique ID of the power reception device can be recognized and it is possible to change into the power feeding capability (power) suitable for this. In addition, it is a means that can be effectively used for foreign object detection.

In the present invention, if it is provided with a plurality of sets, each having at least the power feeding coil, resonant capacitor, and switch circuit of the power feeder, it is possible to increase the power feeding capability (electric power) by expanding the power feeding range. In this case, a plurality of main control devices may be provided, or one control device may be provided. Either way, each set is controlled to work independently or cooperatively.

For example, it is preferable to have characteristics in that a single power feeding unit has all the main control functions for controlling the whole, and has means for appropriately controlling the state of the plurality of power feeders, i.e., the stop state, standby state (sleep state), and normal state of the power feeding.

Figure 7:
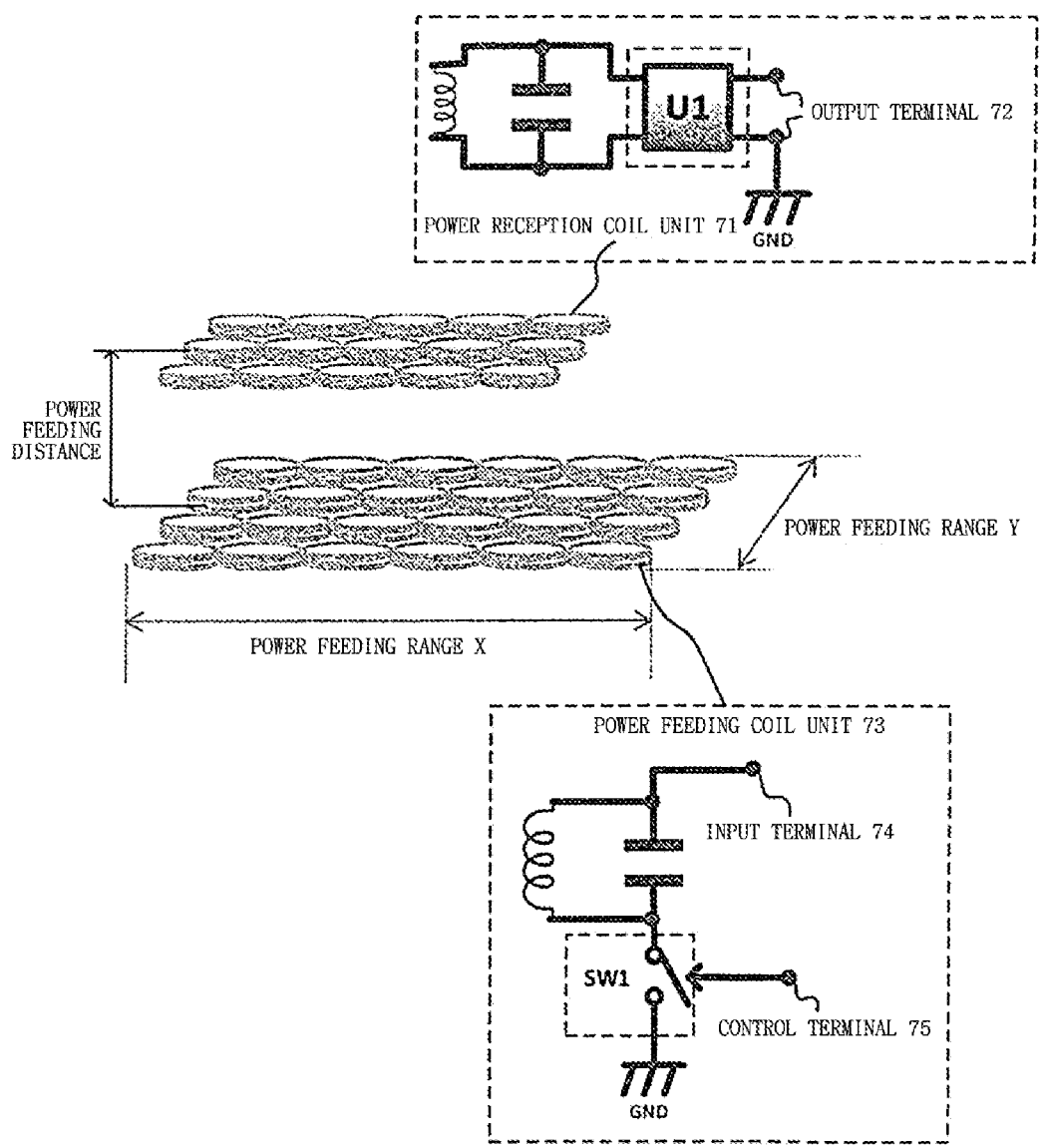
FIG. 7 is a diagram illustrating an image having a plurality of units.

FIG. 7 is an image diagram with a plurality of units. It becomes an image in which the power feeder and the power receiver shown in FIG. 1 are made into a unit, and a plurality is parallelized. In this figure, there are 15 power reception coil units 71. The power reception coil unit 71 has an output terminal 72, and a large amount of power can be obtained by collecting the power output from the output terminals of all power reception coil units. For example, if one unit is 100 W, 1500 W of power can be obtained if all 15 units are fully fed. 24 feeding coil units 73 are arranged in parallel, 6 in the feeding range (X) and 4 in the feeding range (Y). As long as the number of power reception coil units is greater than this number, it is possible to widen the power feeding range by arranging many numbers of the units. The power feeding coil unit 73 is a unit provided with an input terminal 74 of power and at least a control terminal 75 for controlling the switch circuit. One main control unit may manage the controlling of these power input and the switch circuit, or each may function independently. The power feeding distance at this time becomes the power feeding distance capability of one power feeding coil unit 73.

Figure 8:
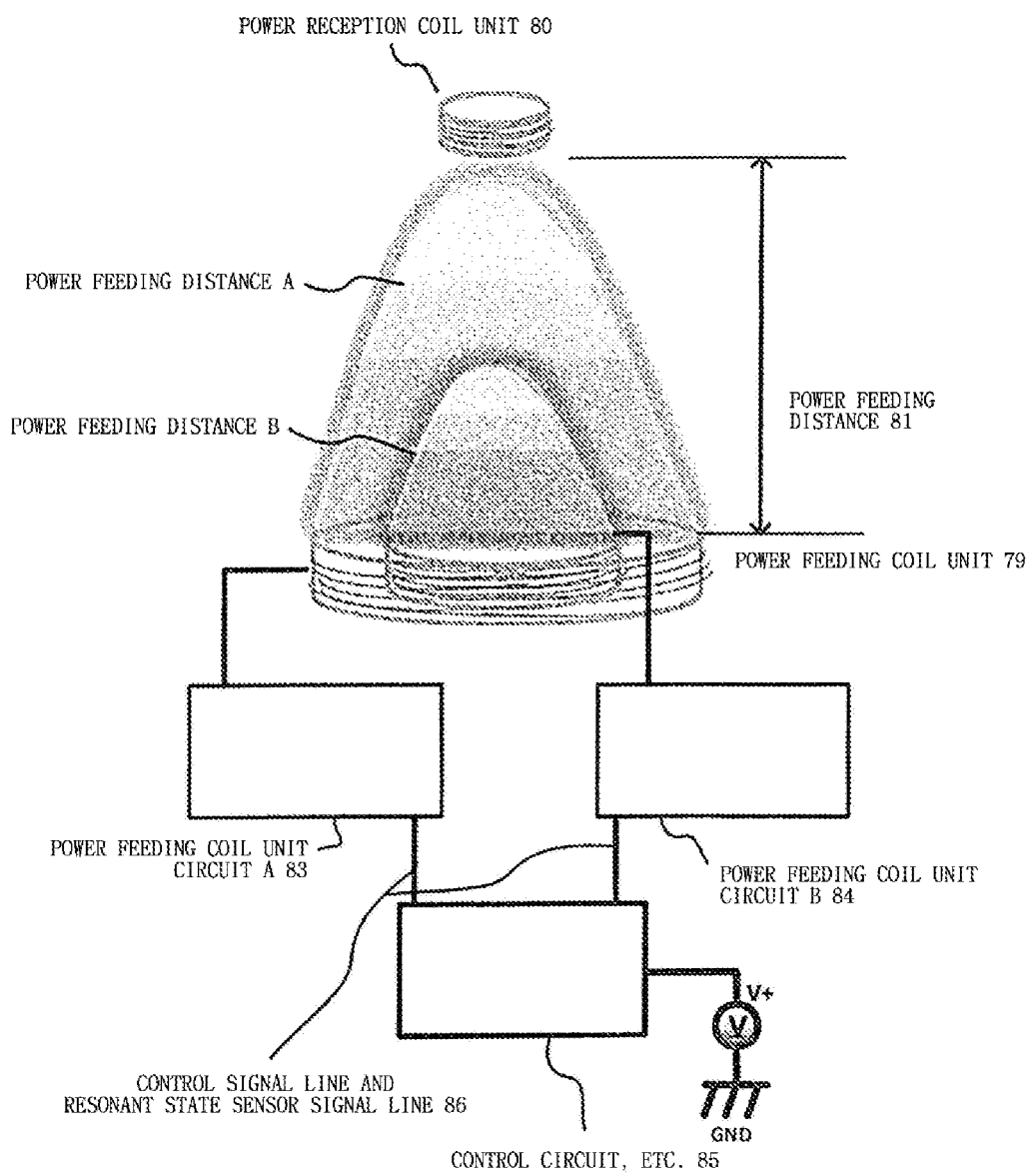
FIG. 8 is a diagram illustrating an image having a plurality of units and increasing a feeding distance.
Figure 9:
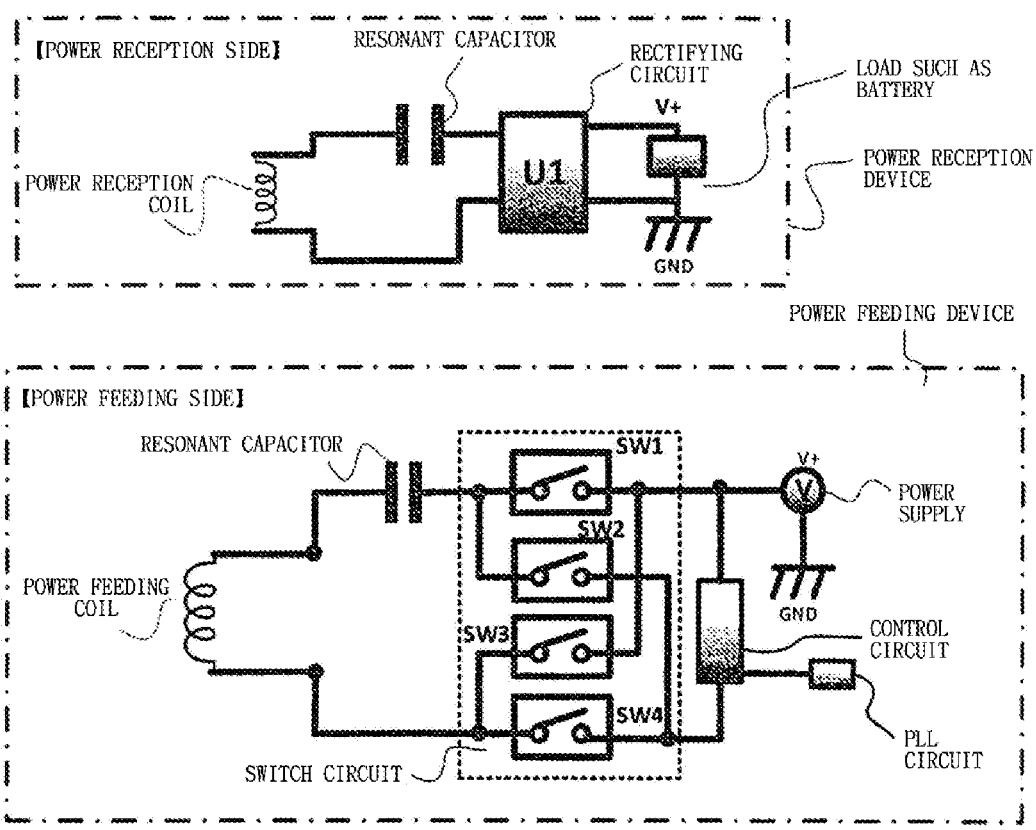
FIG. 9 is a basic circuit configuration diagram in the case where a power feeding side resonant circuit is a series resonant circuit (reference diagram).

FIG. 8 is an image with a plurality of units and an increased power feeding distance. As described above, it has been described that there is a power feeding distance (power feeding range) or coupling coefficient indicating the high power feeding efficiency of the present invention. Also, it has been explained that the resonance frequency varies at the position of the power reception coil. Originally, it is desirable to properly adjust the resonance frequency, but as a method of controlling the power feeding distance and power feeding range, the purpose can be achieved by appropriately changing the power feeding coil units having a plurality of different specifications. The power feeding coil unit is configured with at least the power feeding coil, the resonant capacitor, and the switch circuit, and forms the specifications by changing the specifications of the power feeding coil and the specifications of the resonance frequency and driving time. In order to feed power to the power reception coil unit 80 of FIG. 8, it is desired to achieve a power feeding distance 81. However, since there is a limit to the position where the power feeding efficiency is high, two types of power feeding coil units are arranged. A large power feeding coil unit is designated as A, and is connected to the power feeding coil unit circuit (A) 83. Such a coil unit exhibits the characteristics of the power feeding distance (A). The power feeding distance is as wide as the size of the coil. On the other hand, the small power feeding coil unit is designated as B and is connected to the power feeding coil unit circuit (B) 84. Such a coil unit exhibits a power feeding distance (B), which is lower than the power feeding distance (A) and has a narrow power feeding range. Here, the power feeding capability (electric power that can be fed) may be increased at the power feeding distance (B). That is, for example, when using in charging the battery of a device, it is possible to properly use two types: the fast charging mode at the power feeding distance (B), and the method of using at a high power feeding distance at the power feeding distance (A). Although FIG. 8 is a block diagram and simplified, a control signal line and a resonant state sensor signal line 86 from each power feeding coil unit circuit are respectively connected to the control circuit 85 and the like. The control circuit sends a control signal while watching the information of the resonant state sensor signal line to control the on/off of power feeding to each power feeding coil unit circuit.

In this case, in the exemplary graph of the power feeding distance and power feeding efficiency of FIG. 5, the distance at which the power can be fed with high efficiency can be increased in the form of sum of the data 42 and 44 of an example of the present invention.

Hereinafter, an embodiment based on the frequency characteristic of power transmission efficiency will be described with reference to FIGS. 10 to 16.

Figure 10:
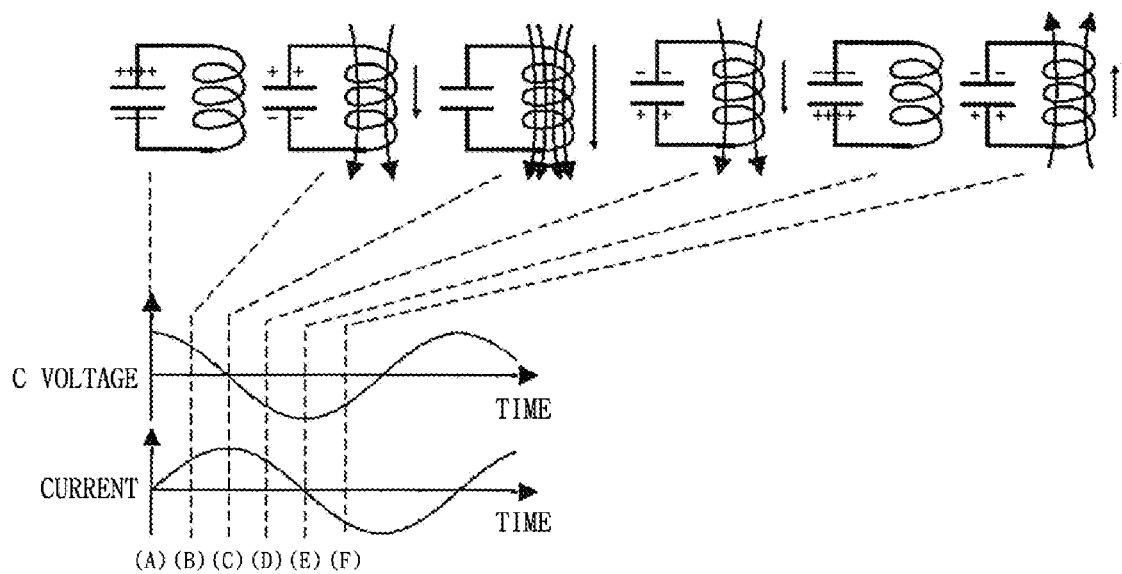
FIG. 10 is a diagram for explaining the relationship between a voltage phase and a current phase of a capacitor in a resonant circuit.

FIG. 10 is a diagram for explaining the relationship between the voltage phase and current phase of the capacitor in the resonant circuit.

In an ideal parallel resonant circuit without loss, energy is conserved by transferring energy between the capacitor and the coil at the timing of the resonance frequency. However, in reality, since there is a loss, the vibration gradually becomes smaller.

FIG. 10 shows a state in which the upper electrode of the capacitor is fully charged with + charge. Energy is stored only in the capacitor, and no energy is stored in the coil in (A).

FIG. 10 shows a state in which the capacitor discharges and a current flows. At this time, the energy stored in the capacitor is transferred to the coil in (B).

FIG. 10 shows a state in which the current is maximum. At this time, the capacitor is discharged and energy is stored only in the coil in (C).

FIG. 10 shows a state in which the current continues to flow and the capacitor is charged in the reverse direction in (D). At this time, the energy stored in the coil is transferred to the capacitor.

FIG. 10 shows a state in which reverse charging of the capacitor has been completed in (E). The energy of the coil is lost and the energy is stored in the capacitor.

FIG. 10 shows a state in which the capacitor is discharged and a current flows in (F). The direction of the current is opposite to the direction of (B) in FIG. 10.

Comparing the phases, the phase of the current flowing through the coil is delayed by 90° compared to the voltage. In addition, the phase of the current flowing through the capacitor is 90° ahead of the voltage.

FIGS. 11A to 11F are diagrams for explaining the difference between a series resonance and a parallel resonance.

Figure 11A:
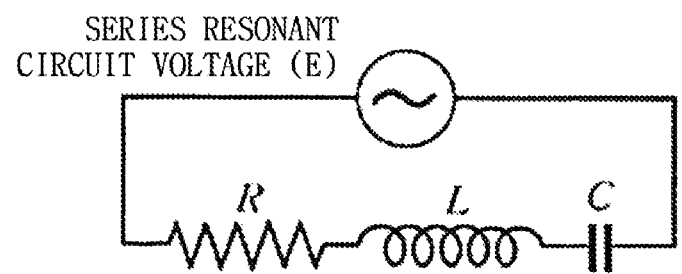
FIGS. 11A to 11F are diagrams for explaining the difference between series resonance and parallel resonance.

FIG. 11A shows the circuit configuration of the series resonant circuit.

Figure 11B:
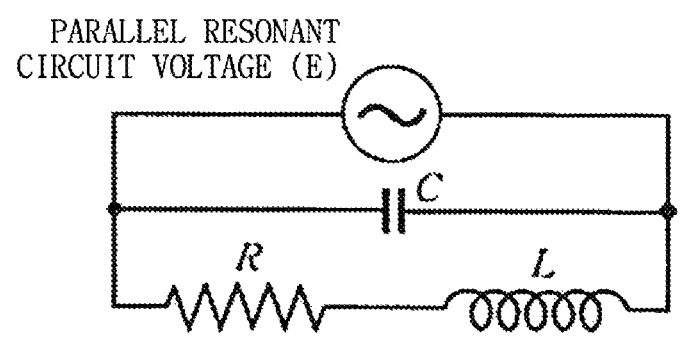

FIG. 11B shows the circuit configuration of the parallel resonant circuit.

Figure 11C:
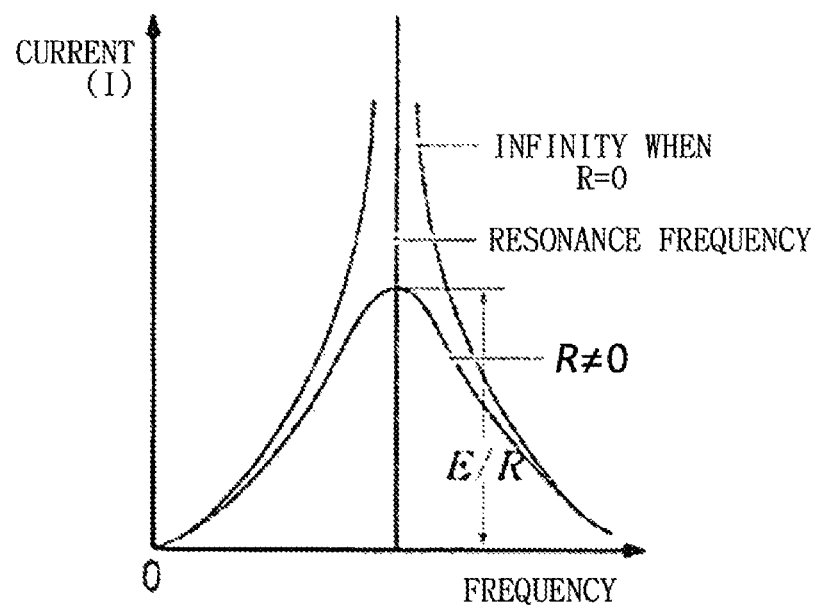

FIG. 11C shows the relationship between the current and the frequency during the series resonance. In the series resonant circuit, the impedance is close to zero at the resonance frequency, and the amount of current passing through is maximized.

Figure 11D:
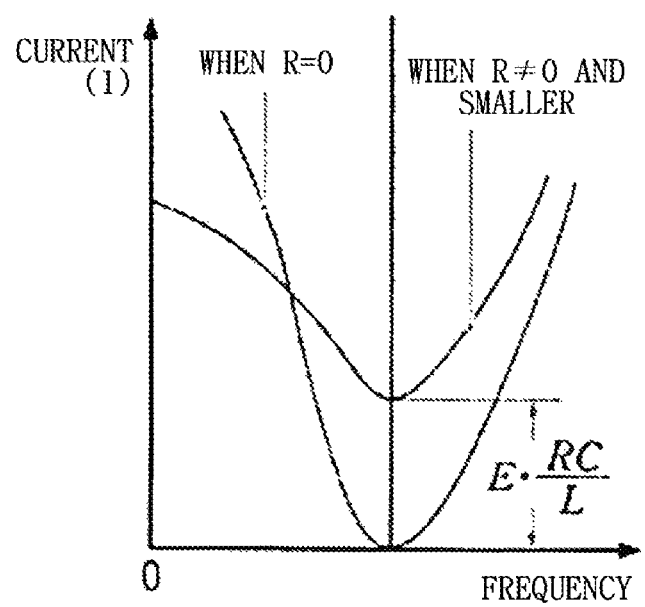

FIG. 11D shows the relationship between the current and the frequency during the parallel resonance. In the parallel resonant circuit, the impedance is close to infinity at the resonance frequency and the amount of current passing through is minimized.

Figure 11E:
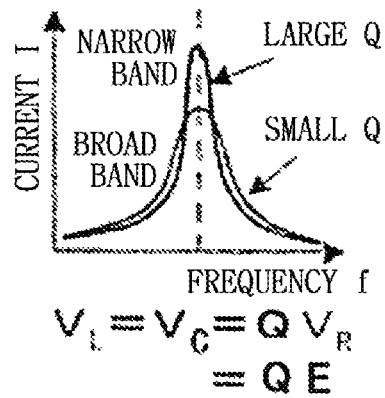

FIG. 11E shows the relationship with the Q value of the series resonant circuit. At resonance, a voltage that is Q times the power supply voltage is applied to L (coil) and C (capacitor).

Figure 11F:
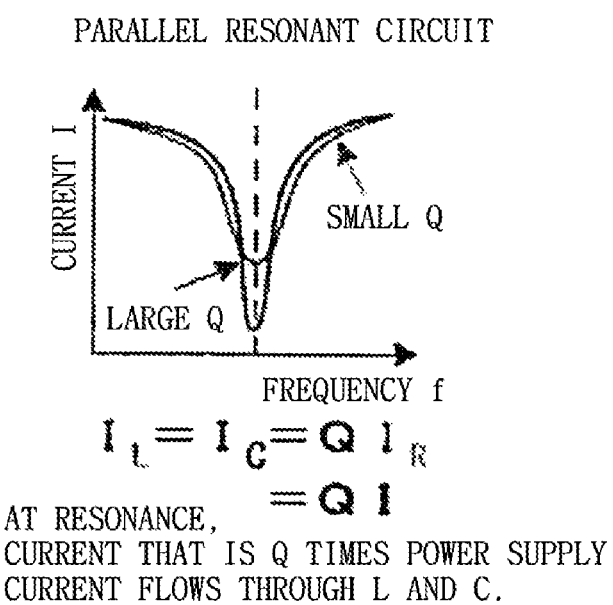

FIG. 11F shows the relationship with the Q value of the parallel resonant circuit. At resonance, a current that is Q times the power supply current flows through L (coil) and C (capacitor).

Figure 12A:
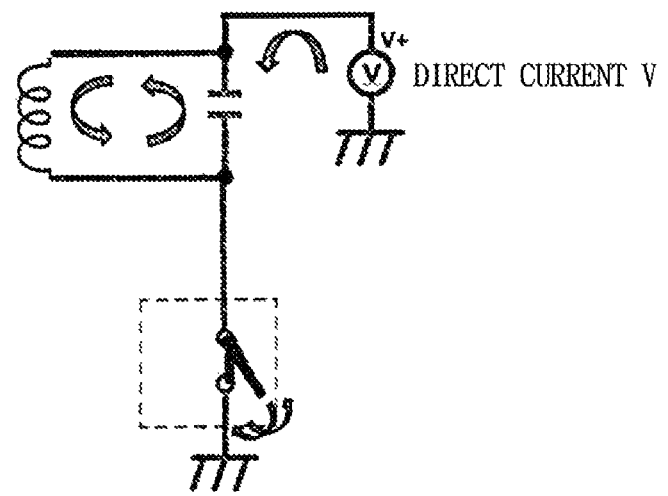
FIGS. 12A and 12B are diagrams for explaining a resonant state and a driving state in a parallel resonant circuit.
Figure 12B:
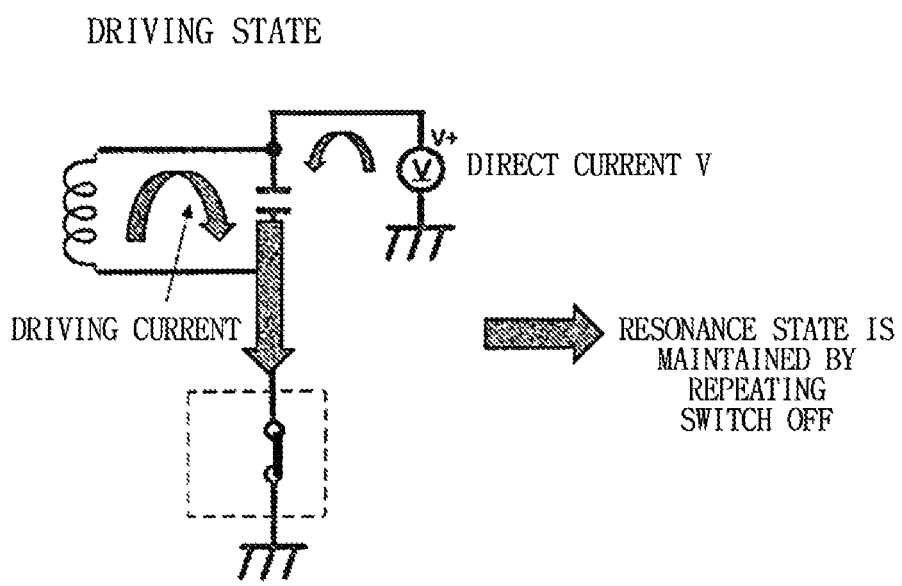

FIG. 12A and FIG. 12B are diagrams for explaining the resonant state and the driving state in the parallel resonant circuit.

FIG. 12A shows a state in which the parallel resonant circuit is stably resonating. A state close to alternative current is created by turning the switch on and off.

FIG. 12B shows the driving state. At the timing when the coil voltage is zero, the switch is turned on and it is connected to the ground. While the coil current flows through the capacitor, the series resonant circuit system operates. That is, the voltage is minimum and current flows. The duty ratio control of 5% to 16% is preferable.

As a result, the parallel resonance and the series resonance are repeated in time division by switching, but at the same time, switching, which is necessary for AC oscillation, is also operated. In terms of AC oscillation, the switching should be done at the duty of 50% in general, but in the present invention, the duty is smaller depending on the power to be fed because the energy transfers to the reception coil during the driving time, that is, at the series resonance. The more appropriate, the more efficient power feeding is possible. In addition, if the duty is too large, switching is performed before because oscillation resumes by ignoring switching with the residual power of AC oscillation.

Figure 13A:
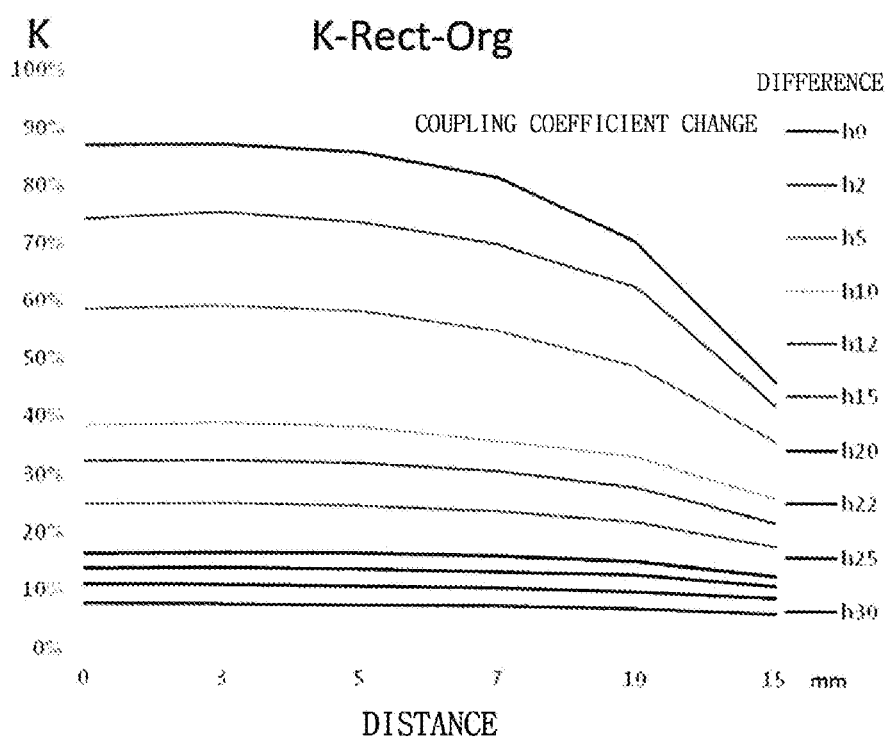
FIGS. 13A to 13C are diagrams for explaining a relationship between a distance and a coupling coefficient.
Figure 13B:
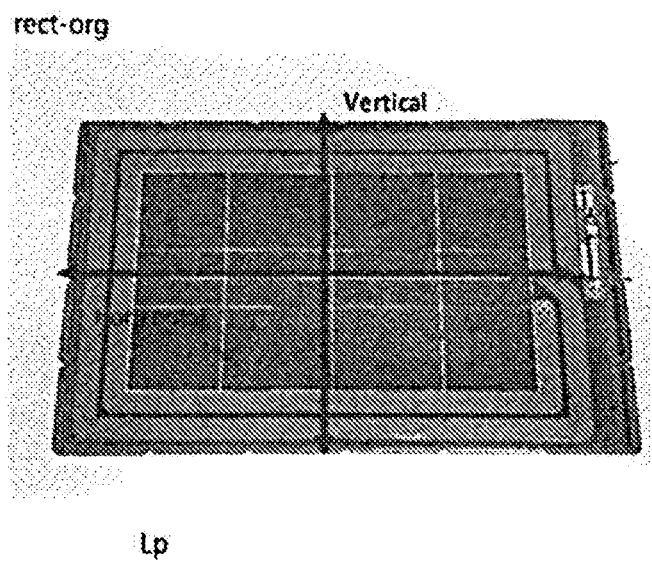
Figure 13C:
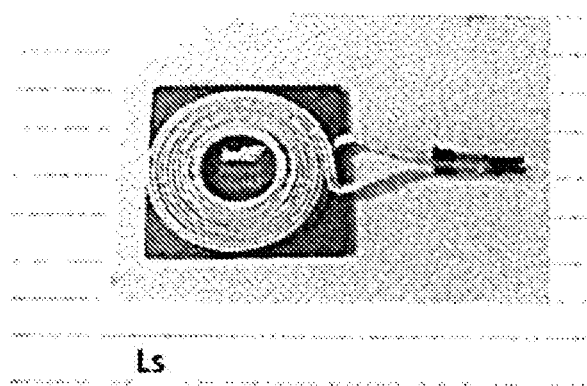

FIGS. 13A to 13C are diagrams for explaining a relationship between a distance and a coupling coefficient.

FIG. 13A is a graph showing how much the coupling coefficient changes depending on the distance (distance between the power feeding coil and the power reception coil) and the difference (the difference between the power feeding coil center and the power reception coil center).

When the coupling coefficient is low, the fluctuation due to distance and difference is small. That is, the power feeding distance and power feeding range (difference) can be greatly secured.

FIG. 13B shows the power feeding coil used for such a data driven operation. A rectangular coil whose longitudinal direction is 3 times the diameter of the power reception coil and the transverse direction is 6 times the diameter of the power reception coil is used. FIG. 13C shows the power reception coil used for this data driven. A coil wound 10 turns in a concentric circle shape is used. The coupling coefficient was measured by connecting an impedance analyzer to the power feeding side and measuring the impedance in the open and short state of the power reception side.

Figure 14A:
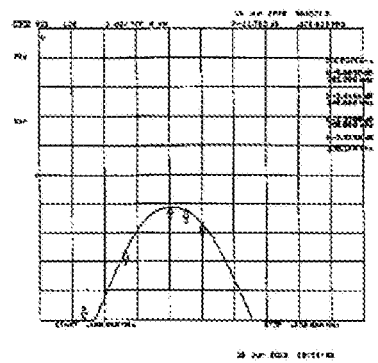
FIGS. 14A to 14D are diagrams for explaining coupling characteristics in the case where a resonance frequency is the same at a power feeding side and a power reception side.
Figure 14B:
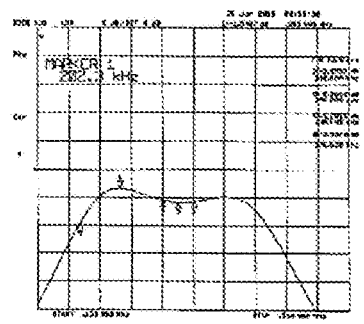
Figure 14C:
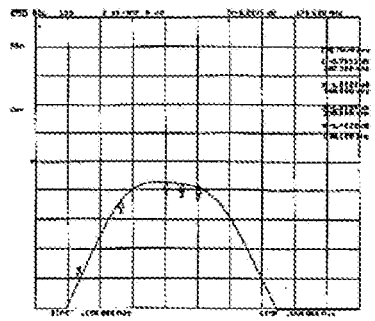
Figure 14D:
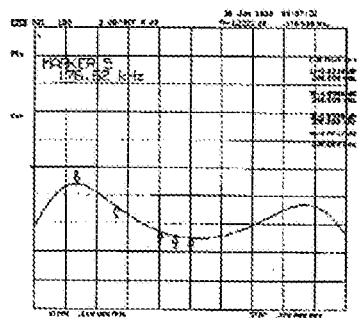

FIGS. 14A to 14D show the coupling characteristic when the resonance frequency is the same at the power feeding side and the power reception side. The core used is a ferrite plate for both the power feeding side and the power reception side, and the coil is 10 μH. All resonance frequencies are equal to 230 kHz. In FIG. 14A, the distance between the power feeding side and the power reception side is 20 mm. In FIG. 14B, the distance between the power feeding side and the power reception side is 10 mm. In FIG. 14C, the distance between the power feeding side and the power reception side is 15 mm. In FIG. 14D, the distance between the power feeding side and the power reception side is 5 mm. When the distance between the coils is 20 mm and the distance between the coils is 15 mm, it is a single tuned characteristic. When the distance between the coils is 10 mm and the distance between the coils is 5 mm, it is a double tuned characteristic.

In general, when the coils resonating at the same frequency come close to each other, a double tuned characteristic appears as shown in this figure. At this time, if it is resonated for the peak of the double tuned, the characteristics will improve, but it is difficult to use this part because it has a narrow resonance frequency and is unstable. As a result, the characteristics are easy to change with respect to the resonance frequency difference caused by changes in the environment such as the power feeding distance and temperature, and thus, there is a need to dynamically adjust the resonance frequency.

Figure 15A:
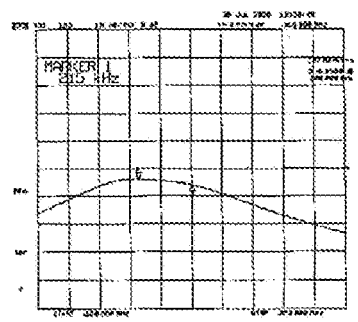
FIGS. 15A to 15D are diagrams for explaining coupling characteristics in the case where resonant frequencies are different at a power feeding side and a power reception side.
Figure 15B:
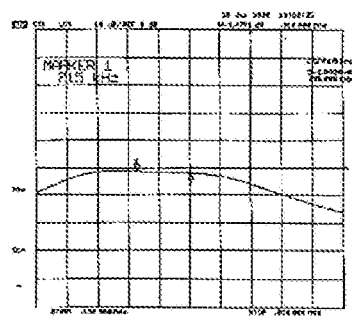
Figure 15C:
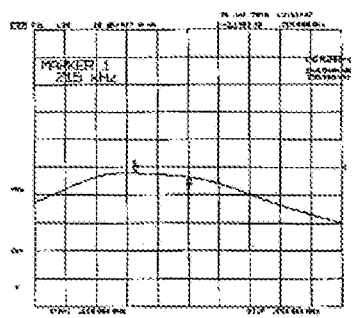
Figure 15D:
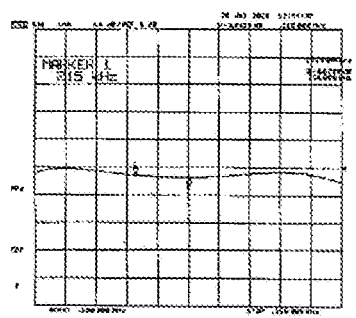

FIGS. 15A to 15D show the coupling coefficients in the case where the resonance frequencies are different at the power feeding side and the power reception side. The core used is a ferrite plate for both the power feeding side and the power reception side, and the coil is 10 μH. The resonance frequency is 250 kHz for the power feeding side and 215 kHz for the power reception side. In FIG. 15A, the distance between the power feeding side and the power reception side is 20 mm. In FIG. 15B, the distance between the power feeding side and the power reception side is 10 mm. In FIG. 15C, the distance between the power feeding side and the power reception side is 15 mm. In FIG. 15D, the distance between the power feeding side and the power reception side is 5 mm. When the distance between the coils is 20 mm and the distance between the coils is 15 mm, it is the single tuned characteristic. When the distance between the coils is 10 mm and the distance between the coils is 5 mm, it is the double tuned characteristic. However, it can be seen that the recess of the valley portion between the two turns constituting the double tuned characteristics is small compared to FIGS. 14A to 14D.

In the present invention, although the resonance frequency is a frequency with a difference between the power feeding side and the power reception side, as a result, the double tuned characteristic, which is a coupling characteristic, is relaxed, and good characteristics are maintained for the resonance frequency difference caused by changes in the environment such as the power feeding distance and temperature. Therefore, in the present invention, if tuning is performed once, a fixed frequency may be basically used.

Figure 16A:
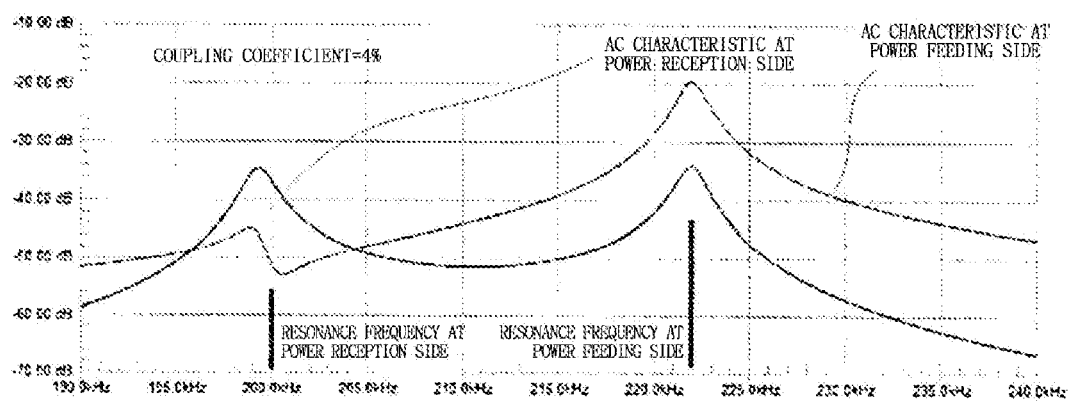
FIGS. 16A to 16C are diagrams for explaining AC characteristics.
Figure 16B:
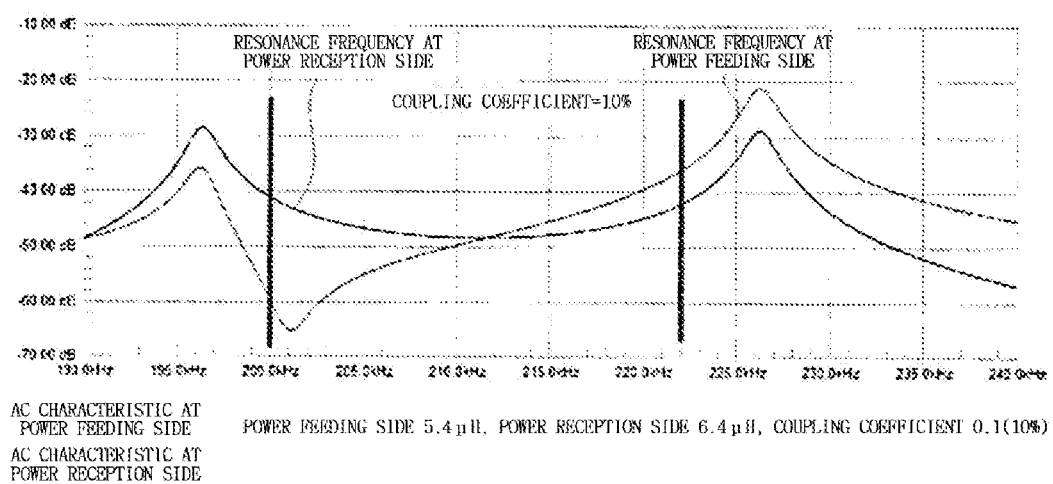
Figure 16C:
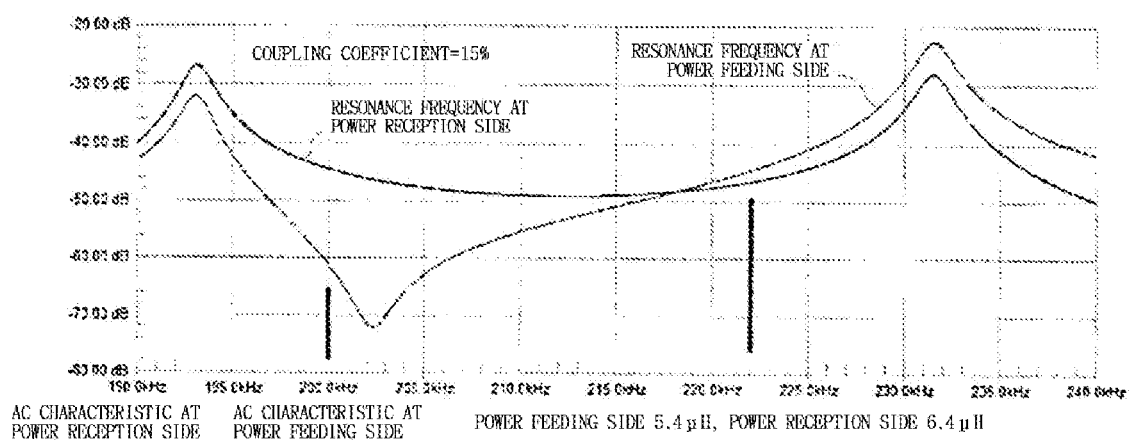

FIGS. 16A to 16C are representative diagrams of AC characteristics. In AC characteristics, the double tuned characteristics can be seen depending on the frequency. The AC characteristic is shown in the coupling coefficient of 4% in FIG. 16A, in the coupling coefficient of 10% in FIG. 16B, and in the coupling coefficient of 15% in FIG. 16C. This figure is for finding the appropriate coupling coefficient and the validity of the difference of the resonance frequency between the power feeding side and the power reception side. As shown in FIG. 16A to 16C, the two peak points of the so-called double tuned characteristic appears in the power reception side AC characteristic. In the system of the present invention, high output can be obtained even when the coupling coefficient is around 10%. It is considered that it effects on this second peak point. However, it is not designed to match the peak points.

Among these low coupling coefficients, it can be proved from this figure that the coupling coefficient of 10% is appropriate, and that as a result, the one where the resonance frequency of the power feeding side and the power reception side is different is better. Although the period, that is, the resonance frequency is calculated by the driving time and the resonance time in the present invention, almost the same result can be obtained even if the resonance frequency is determined based on the AC characteristics.

At the coupling coefficient of 4%, in the case of the (power feeding side) resonance frequency of FIG. 16A, it is affected by the double tuned characteristic, but the influence is very small at the coupling coefficient of 15%. In other words, if the coupling coefficient is correctly designed at a predetermined (power feeding side) resonance frequency, it is possible to design such that abrupt fluctuations such as the peak point of the double tuned characteristic is not shown.

Conversely, it is possible to design an appropriate (power feeding side) resonance frequency based on the determined coupling coefficient.

DESCRIPTION OF REFERENCE NUMERALS

1: power reception coil
2: power receiver
3: power reception side resonant capacitor
4: rectifying circuit
5: load
6: voltage stabilization circuit
7: Schottky barrier diode
10: power feeder
11: power feeding coil
12: switch circuit
14: power feeding side resonant capacitor
15: frequency adjustment circuit
16: resonant state sensor
17: control circuit
18: power supply
19: current sensor
20: voltage sensor
21: driving voltage pulse
22: resonant coil current
23: resonant coil voltage
24: driving current
25: driving pulse width
26: power feeding side resonance period
27: power reception side resonance period
28: driving time
29: resonance time
31: driving voltage pulse
32: power reception side diode current
33: driving side resonant coil voltage
34: driving current
35: power reception coil current
37: power reception side resonance period
41: data of a general series resonant circuit
42: data of an embodiment of the present invention
43: thickness of a case
51: data of a general series resonant circuit
52: data of an embodiment of the present invention
71: power reception coil unit
72: output terminal
73: power feeding coil unit
74: input terminal
75: control terminal
79: power feeding coil unit
80: power reception coil unit
81: power feeding distance
83, 84: power feeding coil unit circuit
85: control circuit
86: control signal line and resonant state sensor signal line

The invention claimed is:

1. A wireless power feeding system of a parallel resonant circuit, comprising:
a power feeder including a power feeding coil for generating magnetic flux and a power feeding circuit unit for supplying power to the power feeding coil to generate the magnetic flux; and
a power receiver including a power reception coil receiving the magnetic flux output from the power feeding coil, and a power reception circuit unit recovering energy generated in the power reception coil by electromagnetic induction,
wherein electrical energy is supplied from the power feeder to the power receiver by the electromagnetic induction using a resonance phenomenon,
the power reception circuit unit of the power receiver includes a power reception side resonant capacitor forming a power reception side resonant circuit to resonate with a power reception side resonance period in combination with the power reception coil,
the power feeding circuit unit of the power feeder includes:
a power feeding side resonant capacitor forming a power feeding side parallel resonant circuit to resonate with a power feeding side resonance period in combination with the power feeding coil;
a switch circuit that respectively and alternatively repeats the power reception side resonance period including a driving state in which a driving current flows and a resonant state in which the driving current is cut off with respect to the power feeding coil of the power feeder as a period,
a control circuit that inputs a driving pulse signal for controlling on and off of the switch circuit and precisely adjusts the power feeding side resonance period of the power feeding side parallel resonant circuit according to a timing of inputting the driving pulse signal; and
a power feeding side tuning adjustment circuit that precisely adjusts a capacitance of the power feeding side resonant capacitor or an inductance of the power feeding coil, and adjusts a sum of the power feeding side resonance period and a pulse width of the driving pulse signal to coincide with the power reception side resonance period.

2. The wireless power feeding system of a parallel resonant circuit according to claim 1, wherein the power reception circuit unit of the power receiver further includes a power reception side tuning adjustment circuit that precisely adjusts the capacitance of the power reception side resonant capacitor or the inductance of the power reception coil.

3. The wireless power feeding system of a parallel resonant circuit according to claim 1, wherein the power feeding side tuning adjustment circuit is conducted so that the power reception side resonance period (t3) is $0.9(t1+t2) \leq t3 \leq 1.1 (t1+t2)$ for an off time of the switch circuit, that is, the time (t1+t2) that is a sum of a driving state time (t1) and a resonant state time (t2) of the power feeder.

4. The wireless power feeding system of a parallel resonant circuit according to claim 3, wherein the power feeding side tuning adjustment circuit includes a single or plurality of other parallel-connected capacitors, and adjusts the capacitance of the power feeding side resonant capacitor by using the single or plurality of capacitors.

5. The wireless power feeding system of a parallel resonant circuit according to claim 3, wherein the switch circuit turns on the driving pulse signal at a timing when a resonant coil voltage becomes near a zero value, maintains the resonant coil voltage near the zero value while the driving pulse signal is on, and controls the driving current with the resonant coil current as an upper limit to flow while the driving pulse signal is on.

6. The wireless power feeding system of a parallel resonant circuit according to claim 3, wherein a distortion component of the resonant coil current generated by the driving current of the power feeder is taken as a magnetic flux fluctuation of the power feeding coil due to the distortion component, and the energy generated in the power reception coil of the power receiver by the electromagnetic induction is recovered in the power reception circuit so that energy transferring from the power feeding circuit to the power reception circuit is implemented.

7. The wireless power feeding system of a parallel resonant circuit according to claim 6, wherein the power feeding coil of the power feeder is composed of a coil with 1 to 5 turns or less, and a size of the coil of the power feeding coil is larger than a size of the power reception coil of the power receiver.

8. The wireless power feeding system of a parallel resonant circuit according to claim 3, wherein the power feeding coil of the power feeder and the power feeding side resonant capacitor constitute a parallel resonant circuit matched to a predetermined resonance frequency, and the power reception coil of the power receiver and the power reception side resonant capacitor constitute either the parallel resonant circuit or a series resonant circuit.

9. The wireless power feeding system of a parallel resonant circuit according to claim 3, wherein a driving time of the power feeder, that is, a time during which a driving pulse is on, is ¼ or less of a resonance frequency period of the power receiver, and the wireless power feeding system further comprises a driving time adjustment circuit that adjusts the driving time so that a power feeding efficiency and an output power of the power receiver increase within the range in consideration of a power feeding range to be obtained, a power feeding distance, and specifications of the power feeding coil and the power reception coil.

10. The wireless power feeding system of a parallel resonant circuit according to claim 3, wherein the tuning adjustment circuit determines the power feeding range, the power feeding distance and the specifications of the power feeding coil and the power reception coil so that a desired power feeding efficiency and the output power of the power receiver are greater than or equal to a predetermined value in a range of the coupling coefficient (K) of the power feeding coil of the power feeder and the power reception coil of the power receiver of 0.3 (30%) or less or the coupling coefficient (K) close to K=0.3 (30%), or adjusts the inductance of the power feeding coil so that the power feeding efficiency becomes high in the driving time.

11. The wireless power feeding system of a parallel resonant circuit according to claim 3, further comprising:
a frequency adjustment circuit for changing a resonance frequency of the power feeder; and
a resonant state sensor,
wherein the resonant state sensor includes:
a voltage sensor and a current sensor connected to the control circuit; and
a phase detection circuit for detecting a phase according to inputs of the voltage sensor and the current sensor,
the control circuit collectively controls both of the switch circuit and the frequency adjustment circuit to adjust a driving pulse time to adjust a power feeding side resonance frequency period based on an output of the resonant state sensor so that the resonance frequency or power feeding capability (power) provides the high power feeding efficiency, and adjusts the resonant capacitor or changes a power feeding coil pattern.

12. The wireless power feeding system of a parallel resonant circuit according to claim 11, wherein when it is determined that it is an abnormal resonance state based on information from the resonant state sensor, the control circuit of the power feeder stops the driving pulse in a normal state to temporarily bring the power feeding efficiency close to zero and moves to a stop or standby state (sleep state) of the power feeding.

13. The wireless power feeding system of a parallel resonant circuit according to claim 12, wherein the control circuit of the power feeder supplies power at a predetermined intermittent or weaker output than usual in the standby state (sleep state), and makes a determination based on an output of the resonant state sensor and returns to the normal state when the power receiver is in a power feedable state.

14. The wireless power feeding system of a parallel resonant circuit according to claim 12, further comprising:
a power feeder complex in which a plurality of power feeders, each including the power feeding coil, the power feeding side resonant capacitor, the switch circuit and the control circuit, is arranged in parallel; and
a collective control circuit for collectively controlling the control circuit of the plurality of power feeders forming the power feeder complex,
wherein the collective control circuit controls the state of the plurality of power feeders, that is, the stop state, standby state (sleep state), and normal state of the power feeding.

15. The wireless power feeding system of a parallel resonant circuit according to claim 14, wherein the collective control circuit sets a specification of each power feeding coil, resonance frequency, and a specification of the driving time to use each of the plurality of power feeders constituting the power feeder complex with changed power feeding distance, power feeding range, and power feeding capability, and controls the state of the plurality of power feeders, that is, the stop state, standby state (sleep state), and normal state of the power feeding, based on the information from the resonant state sensor installed in each of the power feeders.

16. The wireless power feeding system of a parallel resonant circuit according to claim 3, wherein the power feeder includes a power feeding side communication means for transmitting and receiving transmission data by changing an amplitude of a carrier wave in response to a bit sequence of transmission data, which is a digital signal,
the power receiver has information determined by individual identification (ID) and a state sensor,
the power feeding side communication means obtains the individual identification and state recognition of the power reception side,
the power feeding side control circuit adjusts a foreign object detection countermeasure and the driving pulse time for increasing the power feeding efficiency, and adjusts the resonance frequency that adjusts the resonant capacitor or changes the power feeding coil pattern.

17. The wireless power feeding system of a parallel resonant circuit according to claim 16, wherein the power receiver has variable output power information related to a required output power,
the power feeding side communication means receives the output power information of the power receiver,
the power feeder further includes a driving time dialogue adjustment circuit for controlling the driving time of the power feeder in the resonance frequency period range of the power receiver in accordance with the output power information received by the power feeding side communication means.

18. A wireless power feeding system, comprising:
a power feeder including a power feeding coil for generating a magnetic flux, a power feeding side resonant capacitor forming a resonant circuit with the power feeding coil, and a power feeding circuit unit for supplying a driving current to the power feeding coil to generate the magnetic flux;
a power receiver including a power reception coil receiving the magnetic flux output from the power feeding coil, a power reception side resonant capacitor forming the resonant circuit with the power reception coil, and a power reception circuit unit recovering energy generated in the power reception coil by electromagnetic induction;
a frequency adjustment circuit for changing a resonance frequency of the power feeder;
a resonant state sensor; and
a control circuit,
wherein electrical energy is supplied from the power feeder to the power receiver by the electromagnetic induction using a resonance phenomenon,
the power feeding circuit unit of the power feeder generates the driving current so that a resonant coil current generated in the power feeding coil by the driving current has distortion compared to a sine wave,
the power feeding coil sends the distortion to the power reception coil as a change in the magnetic flux generated in the power feeding coil by the driving current,
the power reception coil receives the distortion as energy generated in the power reception coil by the electromagnetic induction,
the power reception circuit recovers the distortion as electrical energy, so that energy transfer is implemented from the power feeding circuit to the power reception circuit,
wherein the resonant state sensor includes:
a voltage sensor and a current sensor connected to the control circuit; and
a phase detection circuit for detecting a phase according to inputs of the voltage sensor and the current sensor,
the control circuit collectively controls both of the power feeding circuit unit and the frequency adjustment circuit to adjust a driving pulse time to adjust a power feeding side resonance frequency period based on an output of the resonant state sensor so that the resonance frequency or power feeding capability (power) provides the high power feeding efficiency, and adjusts a power feeding side resonant capacitor or changes a power feeding coil pattern,
wherein when it is determined that it is an abnormal resonance state based on information from the resonant state sensor, the control circuit of the power feeder stops the driving pulse signal in a normal state to temporarily bring the power feeding efficiency close to zero and moves to a stop or standby state (sleep state) of the power feeding.

19. The wireless power feeding system according to claim 18, wherein the resonant circuit including the power feeding side power feeding coil and the power feeding side resonant capacitor includes a tuning adjustment circuit that precisely adjusts the capacitance of the power feeding side resonant capacitor or the inductance of the power feeding coil,
the power feeding coil of the power feeder is composed of a coil with 1 to 5 turns or less, and a size of the coil of the power feeding coil is larger than a size of the power reception coil of the power receiver.

20. The wireless power feeding system according to claim 18, wherein the power feeding coil of the power feeder and the power feeding side resonant capacitor constitute a parallel resonant circuit, and the power reception coil of the power receiver and the power reception side resonant capacitor constitute either the parallel resonant circuit or a series resonant circuit.

21. The wireless power feeding system according to claim 18, wherein the power feeding circuit unit of the power feeder further includes a driving time adjustment circuit that adjusts a driving time in which a driving current is provided to the power feeding coil to ¼ or less of a resonance frequency period of the power receiver, and the driving time adjustment circuit adjusts the distortion so that in consideration of a power feeding range to be obtained, a power feeding distance, and specifications of the power feeding coil and the power reception coil, the power feeding efficiency increases in the range of the driving time.

22. The wireless power feeding system according to claim 18, further comprising a tuning adjustment circuit that adjust a coupling coefficient (K) of the power feeding coil of the power feeder and the power reception coil of the power receiver to a range of 0.3 (30%) or less or close to K=0.3 (30%),
wherein the tuning adjustment circuit adjusts the distortion with the coupling coefficient and the driving time so that in consideration of a required power feeding range, a power feeding distance, and specifications of the power feeding coil and the power reception coil, a power feeding efficiency increases in the driving time.

23. The wireless power feeding system according to claim 18, wherein the control circuit of the power feeder supplies power at a predetermined intermittent or weaker output than usual in the standby state (sleep state), and makes a determination based on an output of the resonant state sensor and returns to the normal state when the power receiver is in a power feedable state.

24. The wireless power feeding system according to claim 18, further comprising:
a power feeder complex in which a plurality of power feeders, each including the power feeding coil, the power feeding side resonant capacitor, a switch circuit and the control circuit, is arranged in parallel; and a collective control circuit for collectively controlling the control circuit of the plurality of power feeders forming the power feeder complex,
wherein the collective control circuit controls the state of the plurality of power feeders, that is, the stop state, standby state (sleep state), and normal state of the power feeding.

25. The wireless power feeding system according to claim 24, wherein the collective control circuit sets a specification of each power feeding coil, resonance frequency, and a specification of the driving time to use each of the plurality of power feeders constituting the power feeder complex with changed power feeding distance, power feeding range, and power feeding capability, and controls the state of the plurality of power feeders, that is, the stop state, standby state (sleep state), and normal state of the power feeding, based on the information from the resonant state sensor installed in each of the power feeders.

26. The wireless power feeding system according to claim 18, wherein the power feeder includes a power feeding side communication means for transmitting and receiving transmission data by changing an amplitude of a carrier wave in response to a bit sequence of transmission data, which is a digital signal,
the power receiver has information determined by individual identification (ID) and a state sensor,
the power feeding side communication means obtains the individual identification and state recognition of the power reception side,
the power feeding side control circuit adjusts a foreign object detection countermeasure and the driving pulse time for increasing the power feeding efficiency, and adjusts the resonance frequency that adjusts the resonant capacitor or changes the power feeding coil pattern.

27. The wireless power feeding system of a parallel resonant circuit according to claim 24, further comprising an information storage device that in response to changing a distance (L) between the power feeding coil and the power reception coil, stores data obtained by an experiment in advance about whether a frequency characteristic of a power transmission efficiency from the power feeding coil to the power reception coil becomes a single tuned characteristic or a double tuned characteristic, and in the case of the double tuned characteristic, how much recess is made between the two tunes constituting the double turns of the double tuned characteristic,
wherein the tuning adjustment circuit precisely adjusts the capacitance of the power feeding side resonant capacitor or the impedance of the power feeding side coil with reference to the data stored in the information storage device, so that the frequency characteristic of the power transmission efficiency from the power feeding coil to the power reception coil continues to be the single tuned characteristic even when the distance between the power feeding coil and the power reception coil is changed, or even in the case of the double tuned characteristic, the power transmission efficiency in the recess between the two tunes constituting the double tuned characteristic is set to be 90% or more of the power transmission efficiency in the lower tune among the two tunes.

28. The wireless power feeding system of a parallel resonant circuit according to claim 27, wherein the tuning adjustment circuit includes a single or plurality of other parallel-connected capacitors, and adjusts the capacitance of the power feeding side resonant capacitor by using the single or plurality of capacitors.

29. The wireless power feeding system of a parallel resonant circuit according to claim 27, wherein the switch circuit turns on the driving pulse signal at a timing when a resonant coil voltage becomes near a zero value, and maintains the resonant coil voltage near the zero value while the driving pulse signal is on, and controls the driving current with the resonant coil current as an upper limit to flow while the driving pulse signal is on.

30. The wireless power feeding system of a parallel resonant circuit according to claim 27, wherein a distortion component of the resonant coil current generated by the driving current of the power feeder is taken as a magnetic flux fluctuation of the power feeding coil due to the distortion component, and the energy generated in the power reception coil of the power receiver by the electromagnetic induction is recovered in the power reception circuit so that energy transferring from the power feeding circuit to the power reception circuit is implemented.

31. The wireless power feeding system of a parallel resonant circuit according to claim 30, wherein the power feeding coil of the power feeder is composed of a coil with 1 to 5 turns or less, and a size of the coil of the power feeding coil is larger than a size of the power reception coil of the power receiver.

32. The wireless power feeding system of a parallel resonant circuit according to claim 27, wherein the power feeding coil of the power feeder and the power feeding side resonant capacitor constitute a parallel resonant circuit matched to a predetermined resonance frequency, and the power reception coil of the power receiver and the power reception side resonant capacitor constitute either the parallel resonant circuit or a series resonant circuit.

33. The wireless power feeding system of a parallel resonant circuit according to claim 27, wherein a driving time of the power feeder, that is, a time during which a driving pulse is on, is ¼ or less of a resonance frequency period of the power receiver, and the wireless power feeding system further comprises a driving time adjustment circuit that adjusts the driving time so that a power feeding efficiency and an output power of the power receiver increase within the range in consideration of a power feeding range to be obtained, a power feeding distance, and specifications of the power feeding coil and the power reception coil.

34. The wireless power feeding system of a parallel resonant circuit according to claim 27, wherein the tuning adjustment circuit determines the power feeding range, the power feeding distance and the specifications of the power feeding coil and the power reception coil so that a desired power feeding efficiency and the output power of the power receiver are greater than or equal to a predetermined value in a range of the coupling coefficient (K) of the power feeding coil of the power feeder and the power reception coil of the power receiver of 0.3 (30%) or less or the coupling coefficient (K) close to K=0.3 (30%), or adjusts the inductance of the power feeding coil so that the power feeding efficiency becomes high in the driving time.

35. The wireless power feeding system of a parallel resonant circuit according to claim 27, further comprising:
a frequency adjustment circuit for changing a resonance frequency of the power feeder; and
a resonant state sensor,
wherein the resonant state sensor includes:
a voltage sensor and a current sensor connected to the control circuit; and
a phase detection circuit for detecting a phase according to inputs of the voltage sensor and the current sensor,
the control circuit collectively controls both of the switch circuit and the frequency adjustment circuit to adjust a driving pulse time to adjust a power feeding side resonance frequency period based on an output of the resonant state sensor so that the resonance frequency or power feeding capability (power) provides the high power feeding efficiency, and adjusts the resonant capacitor or changes a power feeding coil pattern.

36. The wireless power feeding system of a parallel resonant circuit according to claim 35, wherein when it is determined that it is an abnormal resonance state based on information from the resonant state sensor, the control circuit of the power feeder stops the driving pulse in a normal state to temporarily bring the power feeding efficiency close to zero and moves to a stop or standby state (sleep state) of the power feeding.

37. The wireless power feeding system of a parallel resonant circuit according to claim 36, wherein the control circuit of the power feeder supplies power at a predetermined intermittent or weaker output than usual in the standby state (sleep state), and makes a determination based on an output of the resonant state sensor and returns to the normal state when the power receiver is in a power feedable state.

38. The wireless power feeding system of a parallel resonant circuit according to claim 36, further comprising:
a power feeder complex in which a plurality of power feeders, each including the power feeding coil, the power feeding side resonant capacitor, the switch circuit and the control circuit, is arranged in parallel; and
a collective control circuit for collectively controlling the control circuit of the plurality of power feeders forming the power feeder complex,
wherein the collective control circuit controls the state of the plurality of power feeders, that is, the stop state, standby state (sleep state), and normal state of the power feeding.

39. The wireless power feeding system of a parallel resonant circuit according to claim 38, wherein the collective control circuit sets a specification of each power feeding coil, resonance frequency, and a specification of the driving time to use each of the plurality of power feeders constituting the power feeder complex with changed power feeding distance, power feeding range, and power feeding capability, and controls the state of the plurality of power feeders, that is, the stop state, standby state (sleep state), and normal state of the power feeding, based on the information from the resonant state sensor installed in each of the power feeders.

40. The wireless power feeding system of a parallel resonant circuit according to claim 27, wherein the power feeder includes a power feeding side communication means for transmitting and receiving transmission data by changing an amplitude of a carrier wave in response to a bit sequence of transmission data, which is a digital signal,
the power receiver has information determined by individual identification (ID) and a state sensor,
the power feeding side communication means obtains the individual identification and state recognition of the power reception side,
the power feeding side control circuit adjusts a foreign object detection countermeasure and the driving pulse time for increasing the power feeding efficiency, and adjusts the resonance frequency that adjusts the resonant capacitor or changes the power feeding coil pattern.

41. The wireless power feeding system of a parallel resonant circuit according to claim 40, wherein the power receiver has variable output power information related to a required output power,
the power feeding side communication means receives the output power information of the power receiver,
the power feeder further includes a driving time dialogue adjustment circuit for controlling the driving time of the power feeder in the resonance frequency period range of the power receiver in accordance with the output power information received by the power feeding side communication means.

42. A wireless power feeding system, comprising:
a power feeder including a power feeding coil for generating a magnetic flux, a power feeding side resonant capacitor forming a resonant circuit with the power feeding coil, and a power feeding circuit unit for supplying a driving current to the power feeding coil to generate the magnetic flux; and
a power receiver including a power reception coil receiving the magnetic flux output from the power feeding coil, a power reception side resonant capacitor forming the resonant circuit with the power reception coil, and a power reception circuit unit recovering energy generated in the power reception coil by electromagnetic induction,
wherein electrical energy is supplied from the power feeder to the power receiver by the electromagnetic induction using a resonance phenomenon,
the power feeding circuit unit of the power feeder generates the driving current so that a resonant coil current generated in the power feeding coil by the driving current has distortion compared to a sine wave,
the power feeding coil sends the distortion to the power reception coil as a change in the magnetic flux generated in the power feeding coil by the driving current,
the power reception coil receives the distortion as energy generated in the power reception coil by the electromagnetic induction,
the power reception circuit recovers the distortion as electrical energy, so that energy transfer is implemented from the power feeding circuit to the power reception circuit,
wherein the power feeder includes a power feeding side communication means for transmitting and receiving transmission data by changing an amplitude of a carrier wave in response to a bit sequence of transmission data, which is a digital signal,
the power receiver has information determined by individual identification (ID) and a state sensor,
the power feeding side communication means obtains the individual identification and state recognition of the power reception side,
the power feeding side control circuit adjusts a foreign object detection countermeasure and the driving pulse time for increasing the power feeding efficiency, and adjusts the resonance frequency that adjusts the resonant capacitor or changes the power feeding coil pattern,
wherein the power receiver has variable output power information related to a required output power,
the power feeding side communication means receives the output power information of the power receiver,
the power feeder further includes a driving time dialogue adjustment circuit for responsively controlling the driving time of the power feeder to be a power required for the power receiver in a range of ¼ or less of the resonance frequency period of the power receiver in accordance with the output power information received by the power feeding side communication means or a required power information.

* * * * *